US012654465B2

(12) United States Patent
Muraki

(10) Patent No.: US 12,654,465 B2
(45) Date of Patent: Jun. 16, 2026

(54) THERMAL PRINT HEAD AND THERMAL PRINTER

(71) Applicant: Rohm Co., Ltd., Kyoto (JP)

(72) Inventor: Kaoru Muraki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 119 days.

(21) Appl. No.: 18/618,758

(22) Filed: Mar. 27, 2024

(65) Prior Publication Data

US 2024/0239111 A1 Jul. 18, 2024

Related U.S. Application Data

(63) Continuation of application No. PCT/JP2022/034202, filed on Sep. 13, 2022.

(30) Foreign Application Priority Data

Oct. 4, 2021 (JP) ................................ 2021-163448

(51) Int. Cl.

| | |
|---|---|
| ***B41J 2/355*** | (2006.01) |
| ***B41J 2/335*** | (2006.01) |
| ***B41J 2/345*** | (2006.01) |
| ***B41J 2/35*** | (2006.01) |
| ***H01C 1/16*** | (2006.01) |
| ***H05B 1/02*** | (2006.01) |

(52) U.S. Cl.

CPC ............... *B41J 2/335* (2013.01); *B41J 2/345* (2013.01); *B41J 2/35* (2013.01); *B41J 2/355* (2013.01); *H01C 1/16* (2013.01); *H05B 1/0241* (2013.01); *B41J 2/3351* (2013.01); *H05B 2203/007* (2013.01)

(58) Field of Classification Search

CPC ..... B41J 2/335; B41J 2/345; B41J 2/35; B41J 2/355; B41J 2/3351; H01C 1/16; H05B 1/0241; H05B 2203/007

See application file for complete search history.

(56) References Cited

FOREIGN PATENT DOCUMENTS

| | | | |
|---|---|---|---|
| JP | 2001-038943 | 2/2001 | |
| JP | 2001038943 A * | 2/2001 | ................ B41J 2/35 |
| JP | 2015-193110 | 11/2015 | |
| JP | 2018-176489 | 11/2018 | |
| JP | 2018176489 A * | 11/2018 | ................ B41J 2/34 |

OTHER PUBLICATIONS

International Search Report issued in International Application No. PCT/2022/034202, Nov. 1, 2022, 3 pages.

Written Opinion issued in International Application No. PCT/2022/034202, Nov. 1, 2022, 3 pages.

* cited by examiner

*Primary Examiner* — Yaovi M Ameh

(74) *Attorney, Agent, or Firm* — HSML P.C.

(57) ABSTRACT

A thermal printhead includes a plurality of heating resistor portions, a first capacitor, a switch section, and a first resistor. The heating resistor portions are electrically connected in parallel to each other. The first capacitor is electrically connected in parallel to the heating resistor portions. The switch section is electrically connected in series to the first capacitor. The first resistor is electrically connected in parallel to the first capacitor.

17 Claims, 16 Drawing Sheets

THERMAL PRINT HEAD AND THERMAL PRINTER

TECHNICAL FIELD

The present disclosure relates to a thermal printhead and a thermal printer.

BACKGROUND ART

Conventionally, thermal printheads are used in thermal printers. A conventional thermal printhead may have a plurality of heating resistor portions arranged along a primary scanning direction (see JP-A-2015-193110, for example). Printing on a print medium is performed by transferring the heat generated at the heating resistor portions to the print medium.

DETAILED DESCRIPTION OF EMBODIMENTS

The following describes preferred embodiments of the present disclosure in detail with reference to the drawings.

In the present disclosure, the terms such as "first", "second", and "third" are used merely as labels and are not intended to impose ordinal requirements on the items to which these terms refer.

First Embodiment

Figure 1:
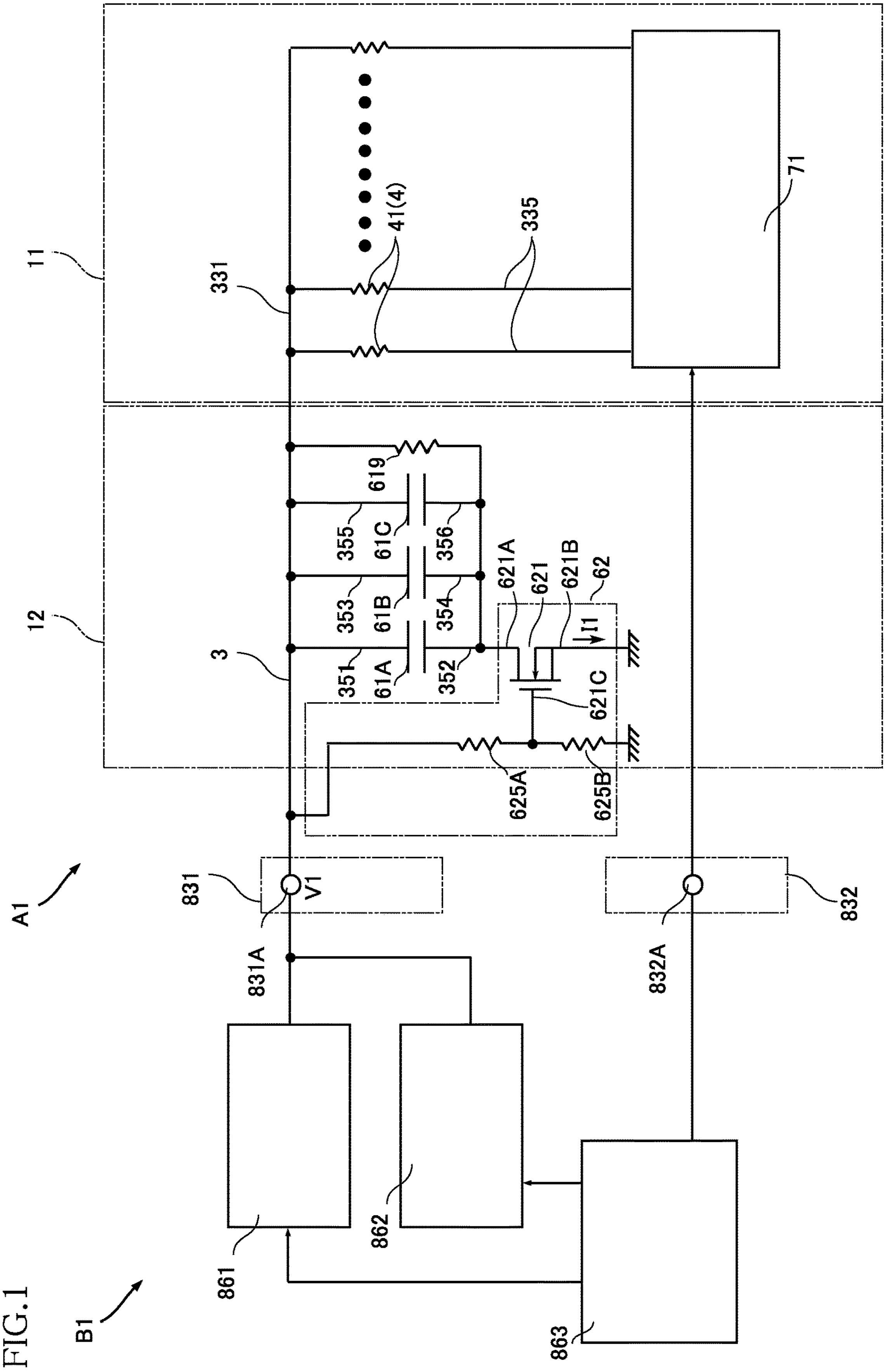
FIG. 1 is a circuit diagram showing the configuration of a thermal printer according to a first embodiment.
Figure 2:
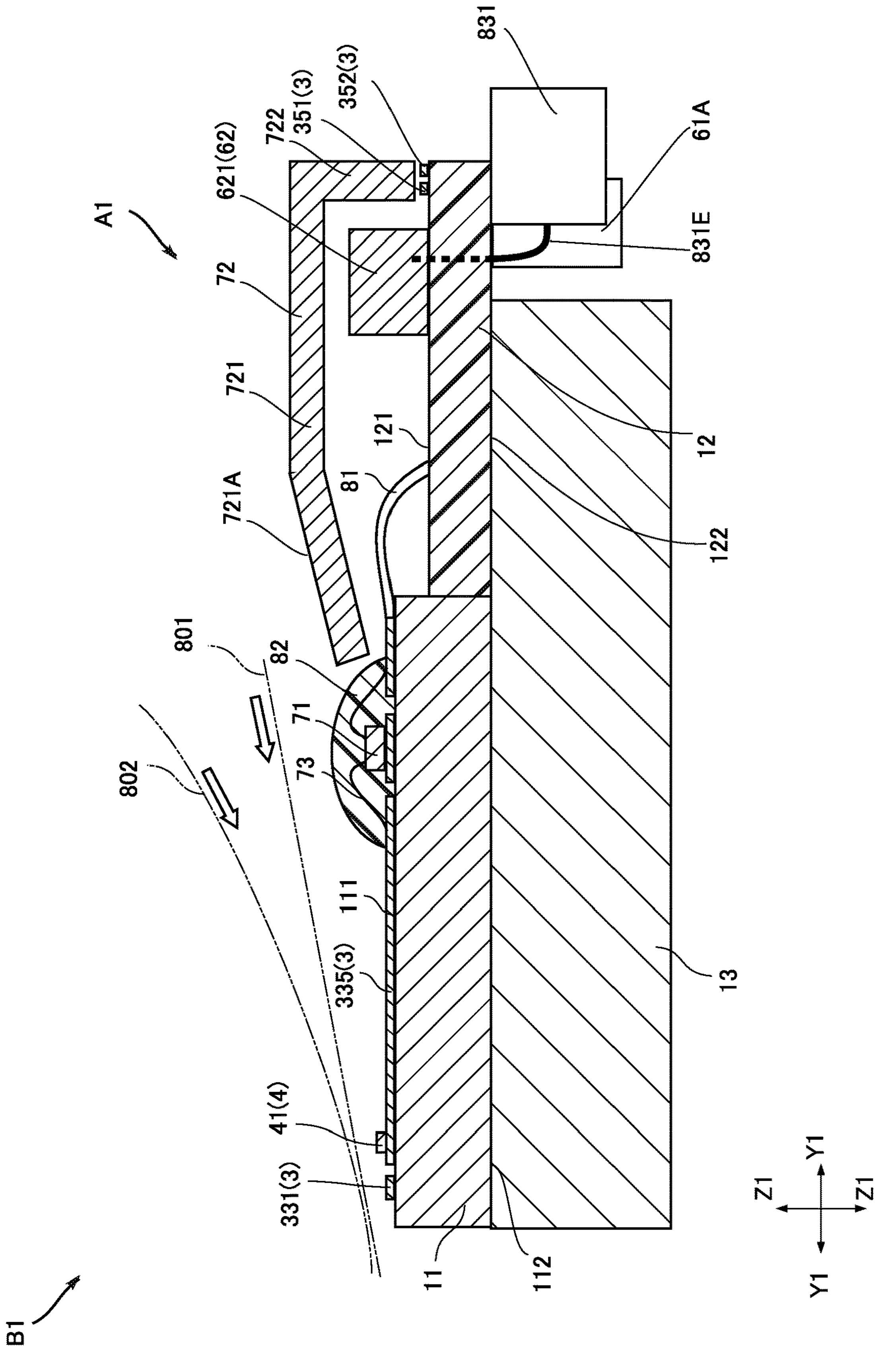
FIG. 2 is a partial sectional view of the thermal printer according to the first embodiment.

FIG. 1 is a circuit diagram showing the configuration of a thermal printer according to a first embodiment. FIG. 2 is a partial sectional view of the thermal printer according to the first embodiment.

The thermal printer B1 shown in these figures performs printing on a print medium 801. Examples of the print medium 801 include thermal paper for producing barcode sheets or receipts.

As shown in FIGS. 1 and 2, the thermal printer B1 includes a thermal printhead A1, a platen roller 802, a main power circuit 861, a measuring circuit 862, and a control unit 863. The platen roller 802 faces the thermal printhead A1.

The main power circuit 861 supplies electric power to the heating resistor portions 41 of the thermal printhead A1. The measuring circuit 862 measures the resistance value of each of the heating resistor portions 41. The measuring circuit 862 measures the resistance value of each heating resistor portion 41 when printing on a print medium 801 is not being performed, for example. Such measurement allows checking the life of the heating resistor portions 41 and the presence or absence of a failed heating resistor portion 41. The control unit 863 controls the drive state of the main power circuit 861 and the measuring circuit 862. The control unit 863 controls the energization of each heating resistor portion 41.

Figure 3:
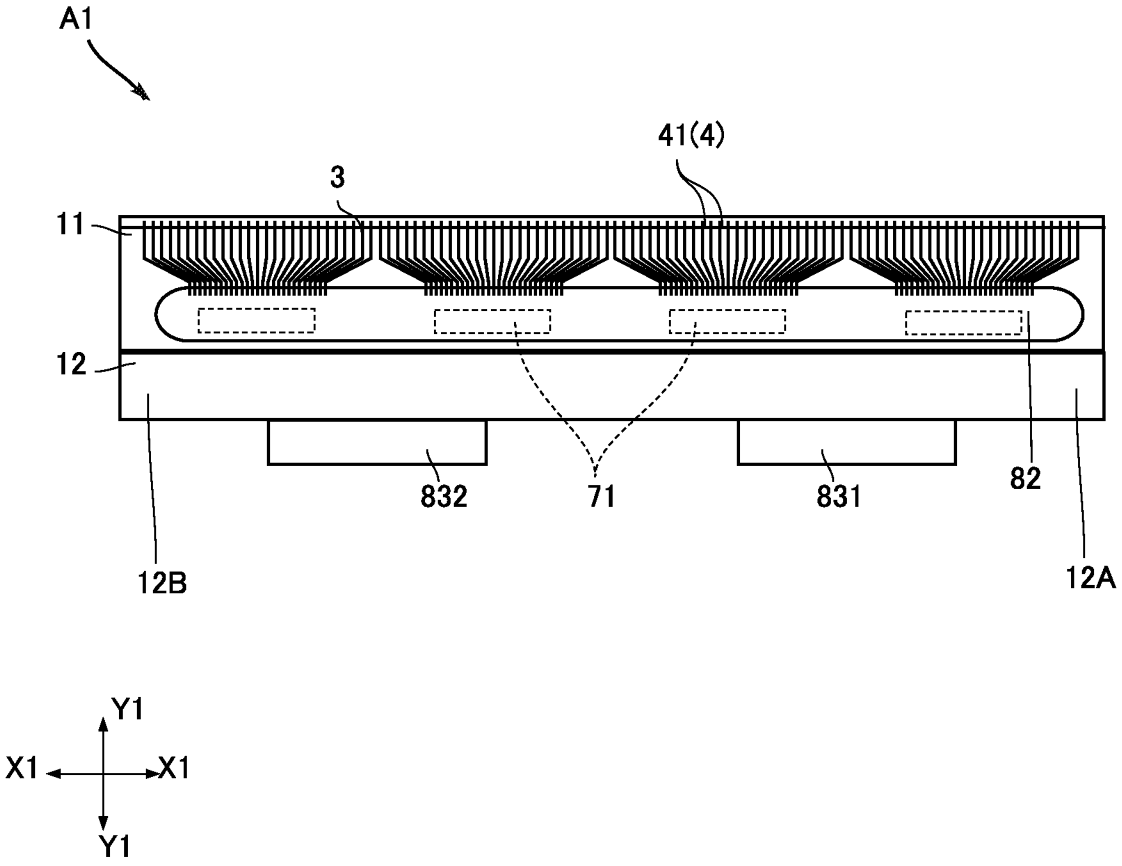
FIG. 3 is a plan view of the thermal printhead of the first embodiment (part of the configuration omitted).

FIG. 3 is a plan view of the thermal printhead of the first embodiment (part of the configuration omitted).

The thermal printhead A1 shown in FIGS. 1 to 3 includes a first substrate 11, a second substrate 12, a heat dissipation plate 13, a wiring 3, a resistor layer 4, a first capacitor 61A, a second capacitor 61B, a third capacitor 61C, a first resistor 619, a switch section 62, a drive IC 71, a cover 72, wires 81, a sealing resin 82, and connectors 831 and 832.

The first substrate 11 is made of an insulating material, for example. The insulating material may be a ceramic material (e.g. alumina). As shown in FIG. 3, the first substrate 11 has a rectangular shape elongated in a primary scanning direction X1. The first substrate 11 has an obverse surface 111 and a reverse surface 112. The obverse surface 111 and the reverse surface 112 face away from each other.

The second substrate 12 is made of an insulating material, for example. The second substrate 12 is formed with a wiring pattern. The insulating material may be a resin (e.g. glass epoxy resin). As shown in FIG. 3, the second substrate 12 has a rectangular shape elongated in the primary scanning direction X1. The second substrate 12 is disposed at a position offset from the first substrate 11 in a secondary scanning direction Y1 orthogonal to the primary scanning direction X1. The second substrate 12 includes a first end region 12A and a second end region 12B. The first end region 12A and the second end region 12B are spaced apart from each other in the primary scanning direction X1. The second substrate 12 has an obverse surface 121 and a reverse surface 122. The obverse surface 121 and the reverse surface 122 face away from each other.

The heat dissipation plate 13 shown in FIG. 2 is made of a material with a higher thermal conductivity than the material forming the first substrate 11. The heat dissipation plate 13 is made of aluminum, for example. The heat dissipation plate 13 is disposed on the reverse surface 112 of the first substrate 11.

The heating resistor portions 41, which are in the resistor layer 4 shown in FIGS. 1 and 2, are disposed on the first substrate 11. The heating resistor portions 41 are arranged along the primary scanning direction X1. The heating resistor portions 41 are electrically connected in parallel to each other. The number of heating resistor portions 41 is 1000 to 10000, for example. The heating resistor portions 41 are made of, for example, ruthenium oxide, which has a resistivity greater than that of the material forming the wiring 3.

The wiring 3 is made of an electrically conductive material. The wiring 3 forms paths for energizing the heating resistor portions 41 in the resistor layer 4. A part of the wiring 3 is disposed on the first substrate 11, and another part on the second substrate 12. Of the wiring 3 shown in e.g. FIG. 2, the part formed on the first substrate 11 is made of resinated Au with an additive element such as rhodium, vanadium, bismuth or silicon added. The part of the wiring 3 on the first substrate 11 includes a common electrode 331 and a plurality of individual electrodes 335 (see also FIG. 1). The individual electrodes 335 are provided to partially energize the resistor layer 4. The individual electrodes 335 have opposite polarity to the common electrode 331.

The connector 831 and the connector 832 shown in FIGS. 1 to 3 are disposed on the second substrate 12. The connector 831 and the connector 832 are used for communication with a device external to the thermal printhead A1. As shown in FIG. 1, the thermal printhead A1 is electrically connected to the main power circuit 861 and the measuring circuit 862 via the connector 831. The thermal printhead A1 is electrically connected to the control unit 863 via the connector 832. The connector 831 and the connector 832 are separately provided in the present embodiment but may be one piece unlike the present embodiment.

Figure 4:
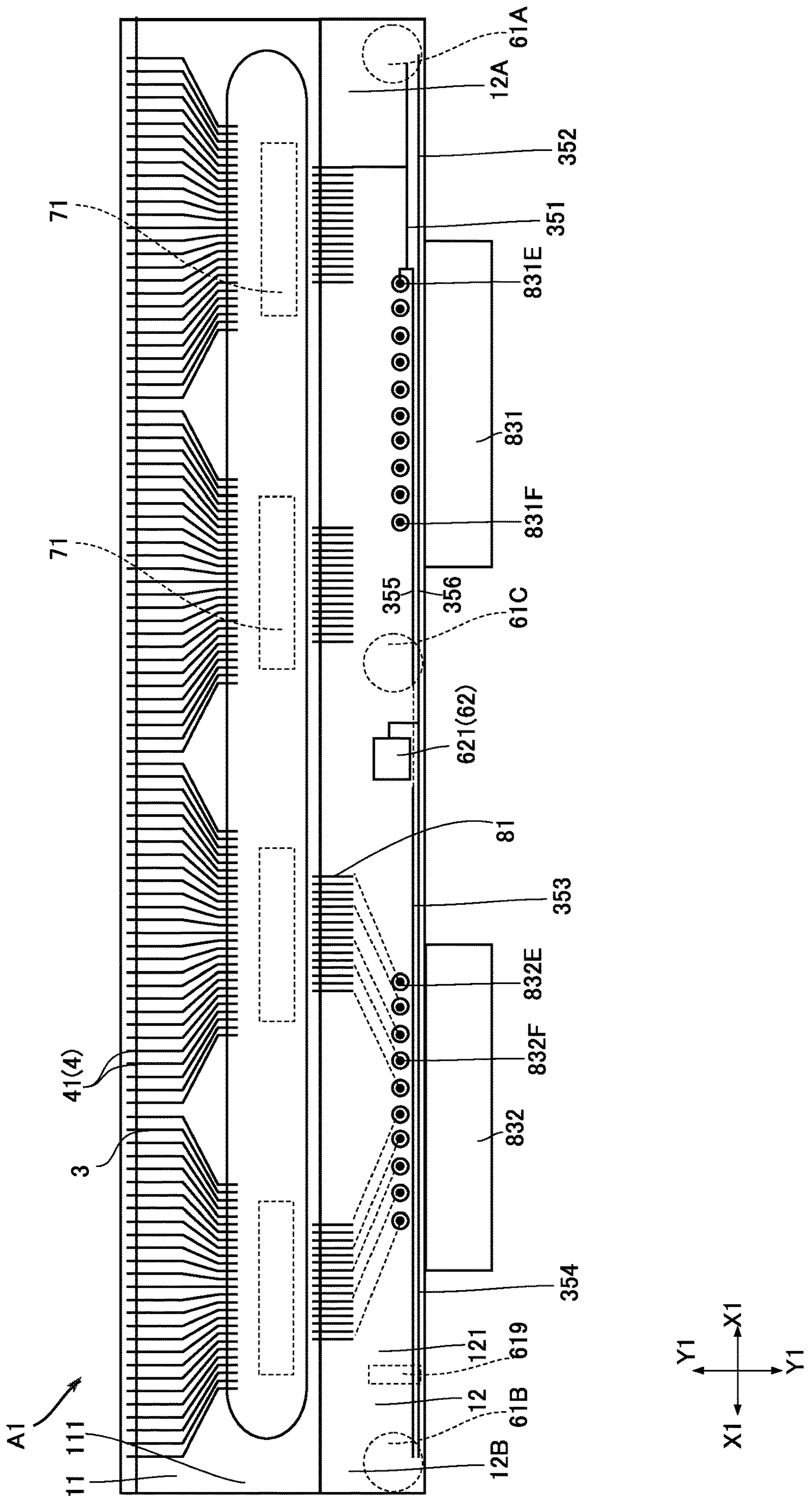
FIG. 4 is an enlarged view of the thermal printhead shown in FIG. 3.
Figure 5:
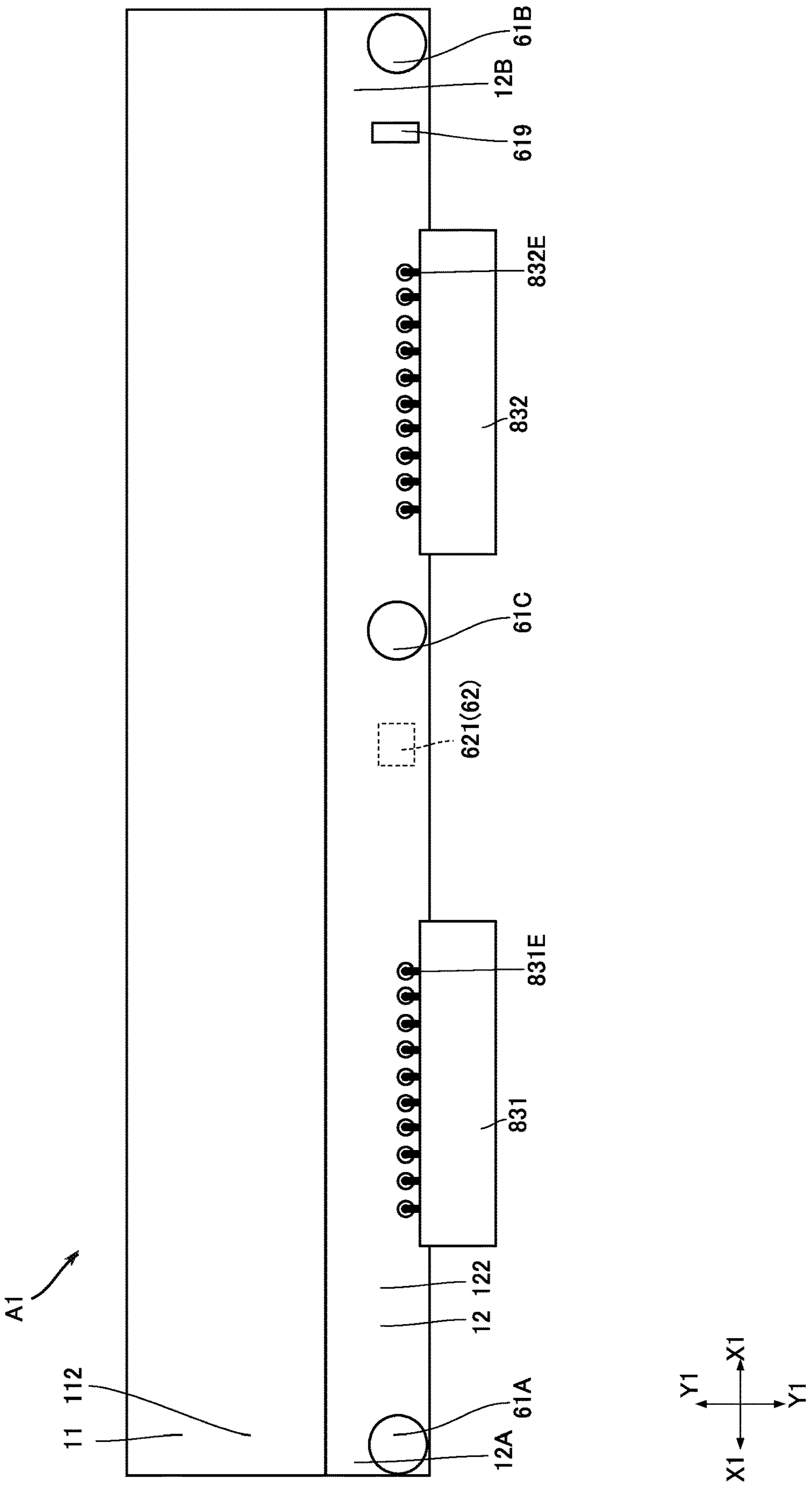
FIG. 5 is a back view of the thermal printhead shown in FIG. 4.

FIG. 4 is an enlarged view of the thermal printhead shown in FIG. 3. FIG. 5 is a back view of the thermal printhead shown in FIG. 4.

As shown in FIGS. 3 and 4, the connector 831 includes a plurality of connector electrodes 831E. In the present embodiment, the connector electrodes 831E extend in the form of rods and are inserted into insertion holes formed in the second substrate 12. Each of the connector electrodes 831E includes a joint 831F bonded to the second substrate 12. In the present embodiment, the joint 831F is the portion of each connector electrode 831E that is in contact with a conductive material (e.g. solder) loaded in an insertion hole of the second substrate 12. As with the connector 831, the connector 832 includes a plurality of connector electrodes 832E and joints 832F. The description of the connector electrodes 832E and joints 832F of the connector 832 is omitted, because the description of the connector electrodes 831E and joints 831F of the connector 831 can be applied.

In the present embodiment, the connector 831 includes a first connector terminal 831A, as shown in FIG. 1. The first connector terminal 831A is electrically connected to the main power circuit 861 and the measuring circuit 862. A predetermined potential V1 is applied from the main power circuit 861 and the measuring circuit 862 to the first connector terminal 831A. The first connector terminal 831A is electrically connected to at least one of the connector electrodes 831E. The first connector terminal 831A is electrically connected to each of the heating resistor portions 41, the first capacitor 61A, the second capacitor 61B, the third capacitor 61C, and the first resistor 619. In the present embodiment, the connector 831 includes a ground terminal (not shown). The connector 832 includes a second connector terminal 832A. The second connector terminal 832A electrically connects the control unit 863 and the drive IC to each other.

The drive IC 71, which is shown in FIGS. 1 to 3, is disposed on the first substrate 11. Unlike the present embodiment, the drive IC 71 may be disposed on the second substrate 12. The drive IC 71 receives signals from the control unit 863 through the connector 832. The drive IC 71 controls the energization of each heating resistor portion 41 based on the signal received from the control unit 863. Specifically, the drive IC 71 selectively energizes the individual electrodes 335 to heat selected one/ones of the heating resistor portions 41. As shown in FIGS. 2 and 4, the wires 81 are electrically connected to the drive IC 71. The wires 81 are bonded to the second substrate 12. Electrode pads (not shown) of the drive IC 71 are electrically connected to the individual electrodes 335 via the wires 73.

As shown in FIG. 1, each of the first capacitor 61A, the second capacitor 61B, the third capacitor 61C and the first resistor 619 is electrically connected in parallel to the heating resistor portions 41. Each of the first capacitor 61A, the second capacitor 61B, the third capacitor 61C, the first resistor 619 and the heating resistor portions 41 is electrically disposed between the first connector terminal 831A and the second connector terminal 832A. Each of the first capacitor 61A, the second capacitor 61B and the third capacitor 61C prevents the amount of heat generated by each heating resistor portion 41 from significantly deviating from the desired value even when the potential V1 (the first potential v11) applied from the main power circuit 861 is transiently different from the desired value for some reason.

As shown in FIGS. 4 and 5, each of the first capacitor 61A, the second capacitor 61B, the third capacitor 61C and the first resistor 619 is disposed on the second substrate 12. In the present embodiment, the first capacitor 61A, the second capacitor 61B, the third capacitor 61C and the first resistor 619 are disposed on the reverse surface 122 of the second substrate 12. The first capacitor 61A, the second capacitor 61B, the third capacitor 61C and the first resistor 619 are spaced apart from each other in the primary scanning direction X1. The first capacitor 61A is disposed in the first end region 12A of the second substrate 12. The second capacitor 61B is disposed in the second end region 12B of the second substrate 12. The third capacitor 61C and the first resistor 619 are disposed between the first capacitor 61A and the second capacitor 61B. Unlike the present embodiment, the thermal printhead A1 may not include one or both of the second capacitor 61B and the third capacitor 61C.

As shown in FIG. 1, the first resistor 619 is electrically connected in parallel to the first capacitor 61A. The first resistor 619 is electrically connected in series to a first transistor 621 of the switch section 62. Also, in the present embodiment, the first resistor 619 is electrically connected in parallel to the second capacitor 61B and the third capacitor 61C.

As shown in FIG. 1, the switch section 62 is electrically connected in series to the first capacitor 61A. In the present embodiment, the switch section 62 is electrically connected in series to the second capacitor 61B and the third capacitor 61C as well. Also, in the present embodiment, the switch section 62 is electrically connected in series to the first resistor 619. The switch section 62 is driven based on the potential V1 at the first connector terminal 831A. The switch section 62 includes a first switch terminal 621A and a second switch terminal 621B. The switch section 62 controls the conduction of the current I1 that may flow between the first switch terminal 621A and the second switch terminal 621B, based on the potential V1 at the first connector terminal 831A.

In the present embodiment, a first potential v11 is applied from the main power circuit 861 to the first connector terminal 831A as the potential V1. A second potential v12 is applied from the measuring circuit 862 to the first connector terminal 831A as the potential V1. When the first connector terminal 831A is at the first potential v11, the current I1 that may flow between the first switch terminal 621A and the second switch terminal 621B has a first current value. When the first connector terminal 831A is at the second potential v12, the current I1 that may flow between the first switch terminal 621A and the second switch terminal 621B has a second current value. The second potential v12 is smaller than the first potential v11 and greater than 0. The first potential v11 is 24 V, for example, and the second potential v12 is 3 to 10 V, for example. The second current value is smaller than the first current value and preferably approximately zero. That is, when the first potential v11 is applied from the main power circuit 861 to the first connector terminal 831A, current conduction paths from the first capacitor 61A (or the second capacitor 61B, the third capacitor 61C, the first resistor 619) to each of the heating resistor portions 41 are established. In contrast, when the second potential v12 is applied from the measuring circuit 862 to the first connector terminal 831A, current conduction paths from the first capacitor 61A (or the second capacitor 61B, the third capacitor 61C, the first resistor 619) to each of the heating resistor portions 41 are substantially blocked. The terms "voltage value" and "current value" in the present disclosure refer to the absolute value of a voltage and the absolute vale of a current, respectively.

In the present embodiment, the switch section 62 includes the first transistor 621, a second resistor 625A, and a third resistor 625B, as shown in FIG. 1. Unlike the present embodiment, the switch section 62 may include a relay element. The first transistor 621 is, for example, a MOSFET (metal oxide semiconductor field effect transistor).

The first transistor 621 includes the first switch terminal 621A, the second switch terminal 621B, and a first control terminal 621C. In the present embodiment, the first transistor 621 is preferably an N-channel MOSFET, but may be a P-channel MOSFET. The first switch terminal 621A may be one of the drain electrode and the source electrode of the MOSFET, while the second switch terminal 621B may be the other one of the drain electrode and the source electrode. The first control terminal 621C controls the conduction of the current I1 that may flow between the first switch terminal 621A and the second switch terminal 621B. The first control terminal 621C may be the gate electrode of the MOSFET. The first control terminal 621C is electrically disposed between the second resistor 625A and the third resistor 625B.

For example, assume that the resistance value of the second resistor 625A and the resistance value of the third resistor 625B are the same. In this case, when the first potential v11 applied from the main power circuit 861 to the first connector terminal 831A as the potential V1 is, for example, 24V, the potential applied to the first control terminal 621C is 12V. On the other hand, when the second potential v12 applied from the measuring circuit 862 to the first connector terminal 831A is, for example, 6V, the potential applied to the first control terminal 621C is 3V. When the first control terminal 621C is connected to the contact between the second resistor 625A and the third resistor 625B, the second resistor 625A and the third resistor 625B function as voltage divider resistors.

As shown in FIG. 4, the first transistor 621 of the switch section 62 is disposed on the second substrate 12. Specifically, the first transistor 621 is disposed on the obverse surface 121 of the second substrate 12. In the present embodiment, the first transistor 621 is disposed between the first capacitor 61A and the second capacitor 61B in the primary scanning direction X1. In this figure, the connector 831 is disposed between the first transistor 621 and the first capacitor 61A in the primary scanning direction X1. The first transistor 621 overlaps with the joint 831F of each connector electrode 831E as viewed along the primary scanning direction X1.

As shown in FIG. 1, the second resistor 625A and the third resistor 625B are electrically connected in series to each other. Each of the second resistor 625A and the third resistor 625B is electrically connected in parallel to the first capacitor 61A, the second capacitor 61B, the third capacitor 61C and the first resistor 619. Unlike the present embodiment, the switch section 62 may not include either one or both of the second resistor 625A and the third resistor 625B.

As shown in FIGS. 1 and 4, the wiring 3 includes a first wiring element 351 and a second wiring element 352. The first wiring element 351 electrically connects the first connector terminal 831A of the connector 831 and either one of the first capacitor 61A and the first transistor 621 to each other. In the present embodiment, the first wiring element 351 electrically connects the first connector terminal 831A and the first capacitor 61A. Unlike the present embodiment, the first wiring element 351 may electrically connect the first connector terminal 831A and the first transistor 621. The second wiring element 352 electrically connects the first capacitor 61A and the first transistor 621.

As shown in FIG. 4, the first wiring element 351 and the second wiring element 352 are disposed on the second substrate 12. In this figure, both the first wiring element 351 and the second wiring element 352 are disposed on the obverse surface 121 of the second substrate 12. The first wiring element 351 and the second wiring element 352 are portions of the wiring pattern formed on the second substrate 12. As shown in the figure, the first wiring element 351 is disposed between the second wiring element 352 and the first substrate 11 in plan view. At least a portion of the second wiring element 352 extends along the primary scanning direction X1 in a region opposite to the first substrate 11 across the joints 831F. The first transistor 621 is located opposite to the first substrate 11 across the wires 81 in the secondary scanning direction Y1.

As shown in FIGS. 1 and 4, the wiring 3 includes a third wiring element 353 and a fourth wiring element 354. The third wiring element 353 electrically connects the first connector terminal 831A of the connector 831 and one of the second capacitor 61B and the first transistor 621. In the present embodiment, the third wiring element 353 electrically connects the first connector terminal 831A and the second capacitor 61B. Unlike the present embodiment, the third wiring element 353 may electrically connect the first connector terminal 831A and the first transistor 621. The fourth wiring element 354 electrically connects the second capacitor 61B and the first transistor 621.

As shown in FIG. 4, the third wiring element 353 and the fourth wiring element 354 are disposed on the second substrate 12. In this figure, both the third wiring element 353 and the fourth wiring element 354 are disposed on the obverse surface 121 of the second substrate 12. The third wiring element 353 and the fourth wiring element 354 are portions of the wiring pattern formed on the second substrate 12. As shown in the figure, the third wiring element 353 is disposed between the fourth wiring element 354 and the first substrate 11 in plan view. At least a portion of the fourth wiring element 354 extends along the primary scanning direction X1 in a region opposite to the first substrate 11 across the joints 832F.

As shown in FIGS. 1 and 4, the wiring 3 includes a fifth wiring element 355 and a sixth wiring element 356. The fifth wiring element 355 electrically connects the first connector terminal 831A of the connector 831 and one of the third capacitor 61C and the first transistor 621. In the present embodiment, the fifth wiring element 355 electrically connects the first connector terminal 831A and the third capacitor 61C. Unlike the present embodiment, the fifth wiring element 355 may electrically connect the first connector terminal 831A and the first transistor 621. The sixth wiring element 356 electrically connects the third capacitor 61C and the first transistor 621. The fifth wiring element 355 may be configured to mutually share a portion with the third wiring element 353, for example. Also, the sixth wiring element 365 may be configured to mutually share a portion with the fourth wiring element 354, for example.

As shown in FIG. 4, the fifth wiring element 355 and the sixth wiring element 356 are disposed on the second substrate 12. In this figure, both the fifth wiring element 355 and the sixth wiring element 356 are disposed on the obverse surface 121 of the second substrate 12. The fifth wiring element 355 and the sixth wiring element 356 are portions of the wiring pattern formed on the second substrate 12. As shown in the figure, the fifth wiring element 355 is disposed between the sixth wiring element 356 and the first substrate 11 in plan view. At least a portion of the sixth wiring element 356 extends along the primary scanning direction X1 in a region opposite to the first substrate 11 across the joints 832F.

The cover 72, which is shown in FIG. 2, is fixed to the second substrate 12 with a screw (not shown), for example. The cover 72 may be made of an electrically conductive material or may be made of an insulating material. The cover 72 includes a covering part 721 and a side part 722. The covering part 721 overlaps with the first transistor 621 in plan view. The covering part 721 includes an inclined surface 721A. The inclined surface 721A faces away from the second substrate 12. The inclined surface 721A approaches the second substrate 12 in the thickness direction Z1 of the second substrate 12 as it approaches the first substrate 11 in the secondary scanning direction Y1. The side part 722 extends from the second substrate 12 toward the covering part 721 and is located opposite to the first substrate 11 across the first transistor 621 in plan view. As shown in FIG. 2, at least a portion of the second wiring element 352 overlaps with the side part 722 of the cover 72 in plan view.

As shown in FIG. 2, the sealing resin 82 covers the drive IC 71. The sealing resin 82 is made of a black soft resin, for example.

Next, the use of the thermal printer B1 will be described.

When printing on a print medium 801, the first potential v11 is applied from the main power circuit 861 to the first connector terminal 831A as the potential V1. In this case, the plurality of heating resistor portions 41 are selectively energized and generate heat under the control of the drive IC 71. The heat is transferred to a print medium 801, whereby printing on the print medium 801 is performed. As mentioned before, when the first potential v11 is applied from the main power circuit 861 to the first connector terminal 831A as the potential V1, current conduction paths from the first capacitor 61A, the second capacitor 61B or the third capacitor 61C to each of the heating resistor portions 41 are established.

When measuring the resistance value of each heating resistor portion 41, no potential is applied from the main power circuit 861 to the connector 831. When measuring the resistance value of each heating resistor portion 41, the second potential v12 is applied from the measuring circuit 862 to the first connector terminal 831A as the potential V1. In this case, the plurality of heating resistor portions 41 are energized in turn (e.g., starting from the heating resistor portion 41 located at an end in the primary scanning direction X1) under the control of the drive IC 71. The measuring circuit 862 measures the resistance value of each heating resistor portion 41 based on the value of the current flowing in the heating resistor portion 41 and the second potential v12. As mentioned before, when the second potential v12 is applied from the measuring circuit 862 to the first connector terminal 831A as the potential V1, current conduction paths from the first capacitor 61A, the second capacitor 61B, the third capacitor 61C and the first resistor 619 to each of the heating resistor portions 41 are substantially blocked. Therefore, when measuring the resistance value of each heating resistor portion 41, the first capacitor 61A, the second capacitor 61B, the third capacitor 61C and the first resistor 619 do not operate to energize the heating resistor portions 41.

Next, the operation and effect of the present embodiment will be described.

Figure 6:
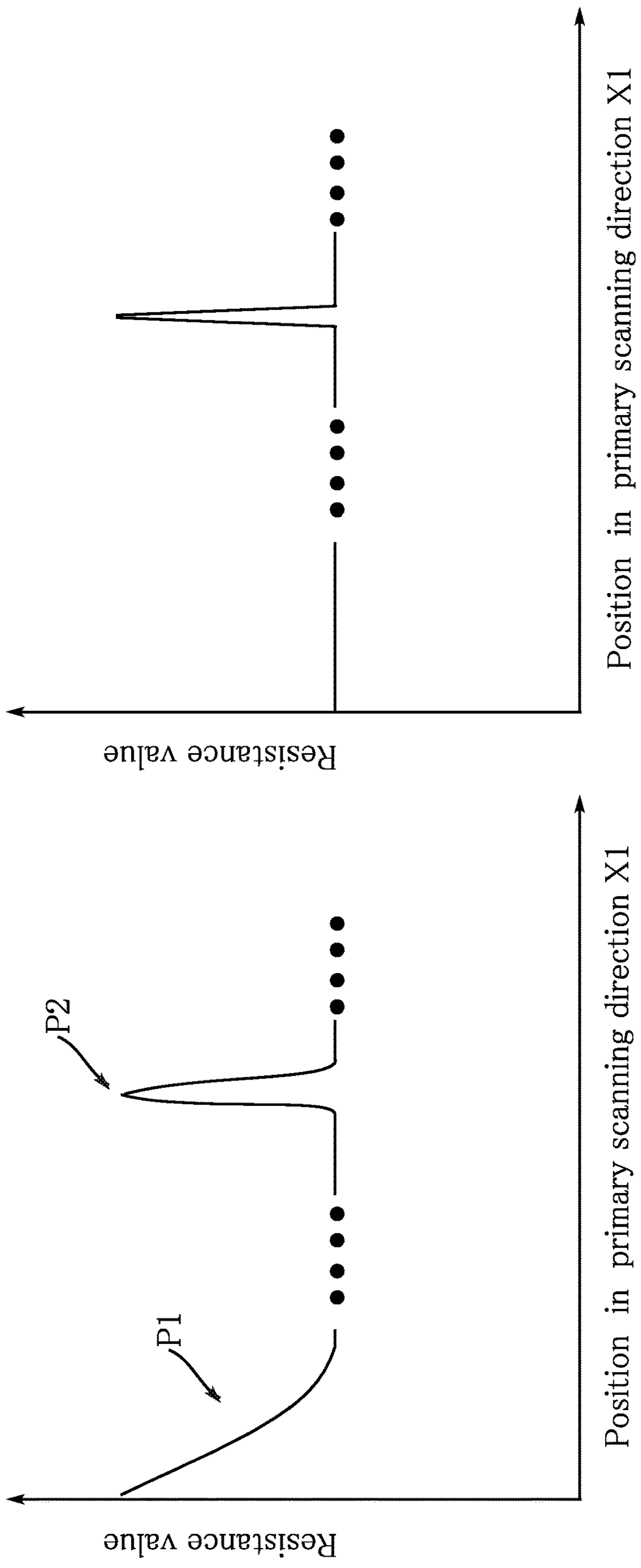
FIG. 6 is a graph schematically showing the results of the measurement of the resistance value of each heating resistor portion by the measuring circuit.

FIG. 6 schematically shows the results of the measurement of the resistance value of each heating resistor portion 41 by the measuring circuit 862. The horizontal axis shows the position of each heating resistor portion 41 in the primary scanning direction X1. The vertical axis shows the resistance value. In this figure, the schematic measurement results of a comparative example are shown on the left, while the schematic measurement results of the present embodiment are shown on the right. The comparative example has the same circuit configuration as the present embodiment except that the comparative example does not include the switch section 62. When measuring the resistance values of the heating resistor portions 41, the resistance value of each heating resistor portion 41 is measured by passing a current through the heating resistor portions 41 one by one, starting from the heating resistor portion 41 located at an end in the primary scanning direction X1.

In the comparative example, the resistance value of the heating resistor portion 41 located at an end in the primary scanning direction X1 represents an unduly high value (see P1 in FIG. 6). Also, the resistance values of a plurality of heating resistor portions 41 located close to a failed heating resistor portion 41 represent values different from the actual values (see P2 in FIG. 6). Supposedly, such incorrect measurements are due to the influence of the first capacitor 61A, the second capacitor 61B, the third capacitor 61C, or the like. In the present embodiment, on the other hand, the thermal printhead A1 includes the switch section 62 electrically connected in series to the first capacitor 61A. Therefore, it is possible to prevent the first capacitor 61A, the second capacitor 61B and the third capacitor 61C from operating to energize the heating resistor portions 41 during the measurement of resistance values of the heating resistor portions 41. Therefore, as shown on the right side in FIG. 6, incorrect measurements like those represented by P1 and P2 on the left side in FIG. 6 can be reduced or prevented. Thus, the resistance value of each heating resistor portion 41 can be measured more accurately by the measuring circuit 862.

When the first potential v11 is applied to the first connector terminal 831A, current conduction paths are established between the heating resistor portions 41 and the first capacitor 61A, and an electric charge is stored in the first capacitor 61A. When the second potential v12 is then applied to the first connector terminal 831A, the first capacitor 61A is electrically disconnected from the heating resistor portions 41. At this time, the charge stored during the conduction of a current remains in the first capacitor 61A. There is concern that if it takes time for this charge to be sufficiently discharged, switching from the printing mode to the measurement mode by the switching of the first transistor 621 may be delayed. In the present embodiment, the first resistor 619 is electrically connected in parallel to the first capacitor 61A. Thus, the charge remaining in the first capacitor 61A is consumed by the first resistor 619. This can shorten the time taken for the first capacitor 61A to sufficiently discharge, so that the thermal print head A1 can be switched more quickly.

In the present embodiment, the first resistor 619 is electrically connected in series to the first transistor 621 of the switch section 62. Therefore, by switching the connection state of the first capacitor 61A by the switch section 62, the first resistor 619 can be switched at the same time.

The first resistor 619 is electrically connected in parallel to the second capacitor 61B and the third capacitor 61C. Therefore, not only the charge stored in the first capacitor 61A but also the charge stored in the second capacitor 61B and the third capacitors 61C can be discharged more quickly.

The thermal printhead A1 includes the first capacitor 61A, the second capacitor 61B, and the third capacitor 61C. Thus, as compared with the case where a single capacitor is used to provide the required capacitance, the height (dimension in the thickness direction Z1 of the second substrate 12) for providing the first capacitor 61A, the second capacitor 61B, and the third capacitor 61C can be reduced. This is favorable for reducing the thickness of the thermal printhead A1 and prevents the thermal printhead A1 from interfering with a print medium 801 or the platen roller 802.

In the present embodiment, the switch section 62 includes the second resistor 625A and the third resistor 625B electrically connected in series to each other. Each of the second resistor 625A and the third resistor 625B is electrically connected in parallel to the first capacitor 61A. The first control terminal 621C is electrically disposed between the second resistor 625A and the third resistor 625B. With such a configuration, the potential applied to the first control terminal 621C can be adjusted by adjusting the resistance values of the second resistor 625A and the third resistor 625B. Therefore, a first transistor 621 with a desired threshold voltage can be used.

In the present embodiment, the first capacitor 61A, the second capacitor 61B and the third capacitor 61C are disposed in the first end region 12A of the second substrate 12. With such a configuration, the length of the portion of the wiring 3 that extends from the first capacitor 61A to the common electrode 331 can be made as short as possible. This suppresses the generation of noise that may occur in the current flowing to the heating resistor portions 41. In the present embodiment, the second capacitor 61B is disposed in the second end region 12B of the second substrate 12. Such a configuration can provide the same advantage.

In the present embodiment, the first transistor 621 is disposed between the first capacitor 61A and the second capacitor 61B in the primary scanning direction X1. With such a configuration, it is possible to prevent one of the length of the portion of the wiring 3 that extends from the first transistor 621 to the first capacitor 61A and the length of the portion of wiring 3 that extends from the first transistor 621 to the second capacitor 61B from becoming extremely long. This suppresses the generation of noise that may occur in the current flowing to the heating resistor portions 41.

In the present embodiment, the first transistor 621 overlaps with the joint of each of the connector electrodes 831E in the secondary scanning direction Y1. Such a configuration allows the first transistor 621 to be located further away from the feed path of the print medium 801. Moreover, in the present embodiment, the covering part 721 includes the inclined surface 721A facing away from the second substrate 12. The inclined surface 721A approaches the second substrate 12 in the thickness direction Z1 of the second substrate 12 as it approaches the first substrate 11 in the secondary scanning direction Y1. Such a configuration allows the cover 72 to be located further away from the feed path of the print medium 801.

FIGS. 7 to 16 show variations and other embodiments of the present disclosure. In these figures, the components that are identical or similar to those of the above-described embodiment are given the same reference signs as those in the above-described embodiment.

Figure 7:
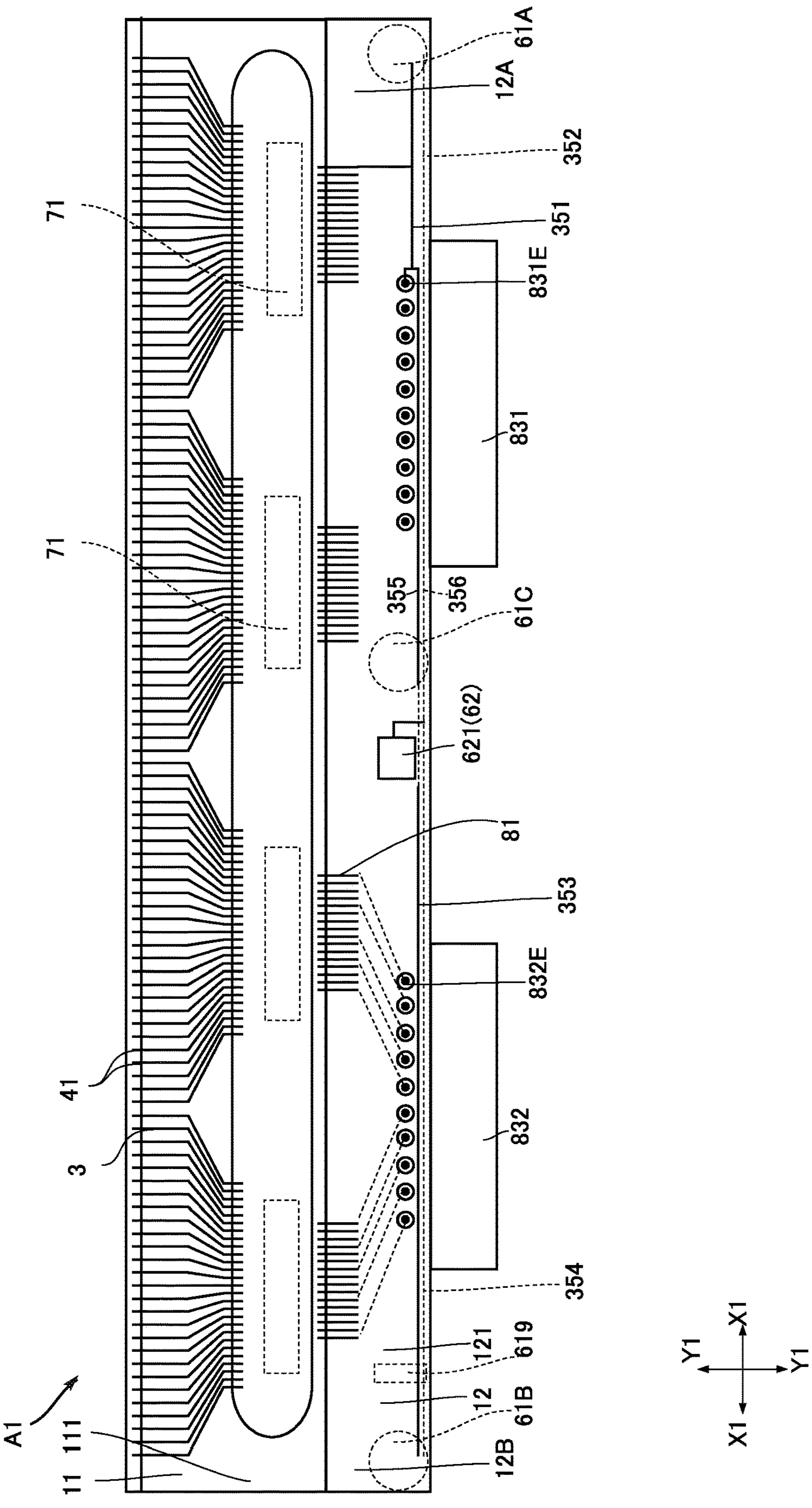
FIG. 7 is a plan view showing another example of the configuration of the thermal printhead.
Figure 8:
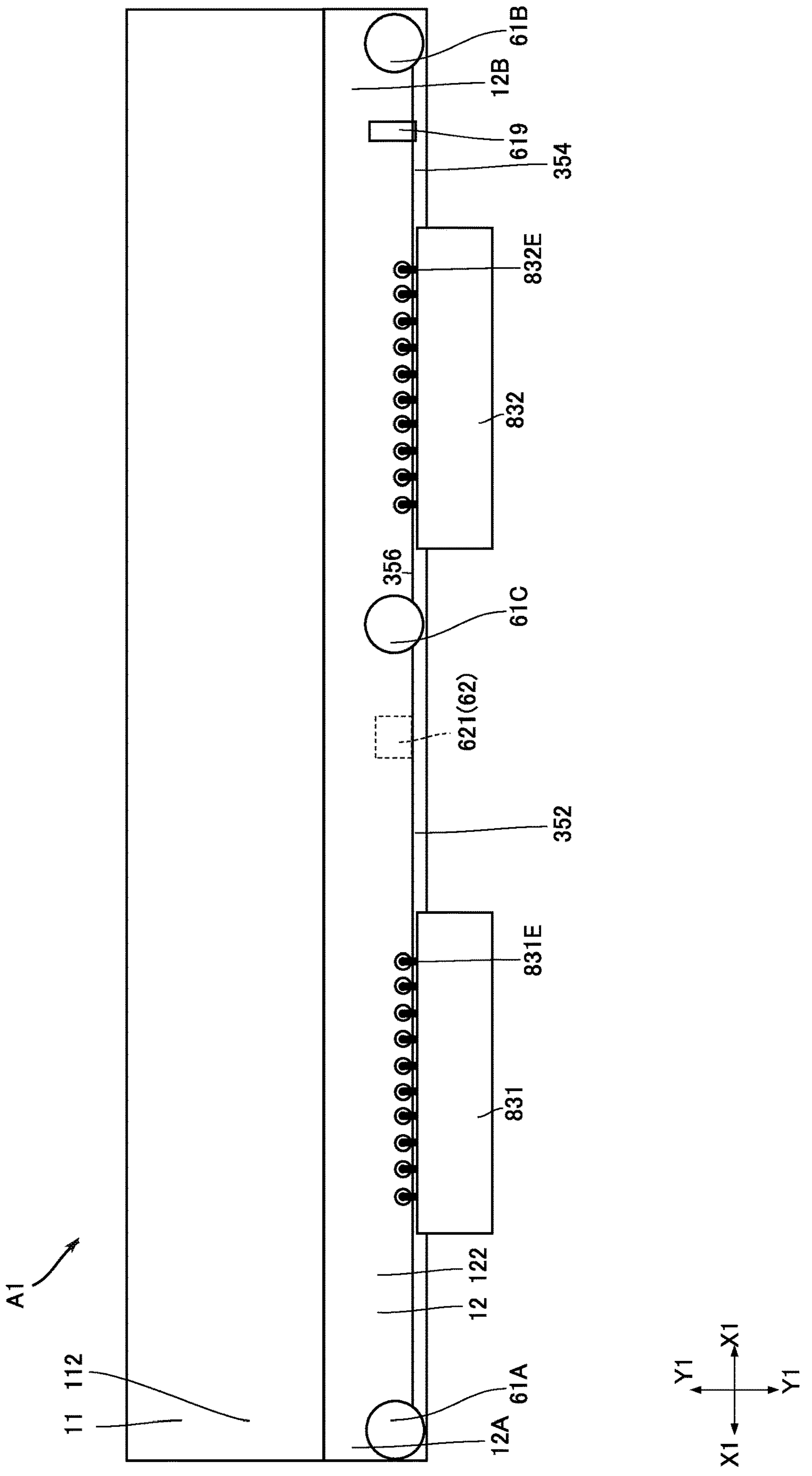
FIG. 8 is a back view showing the example of the configuration of the thermal printhead.
Figure 9:
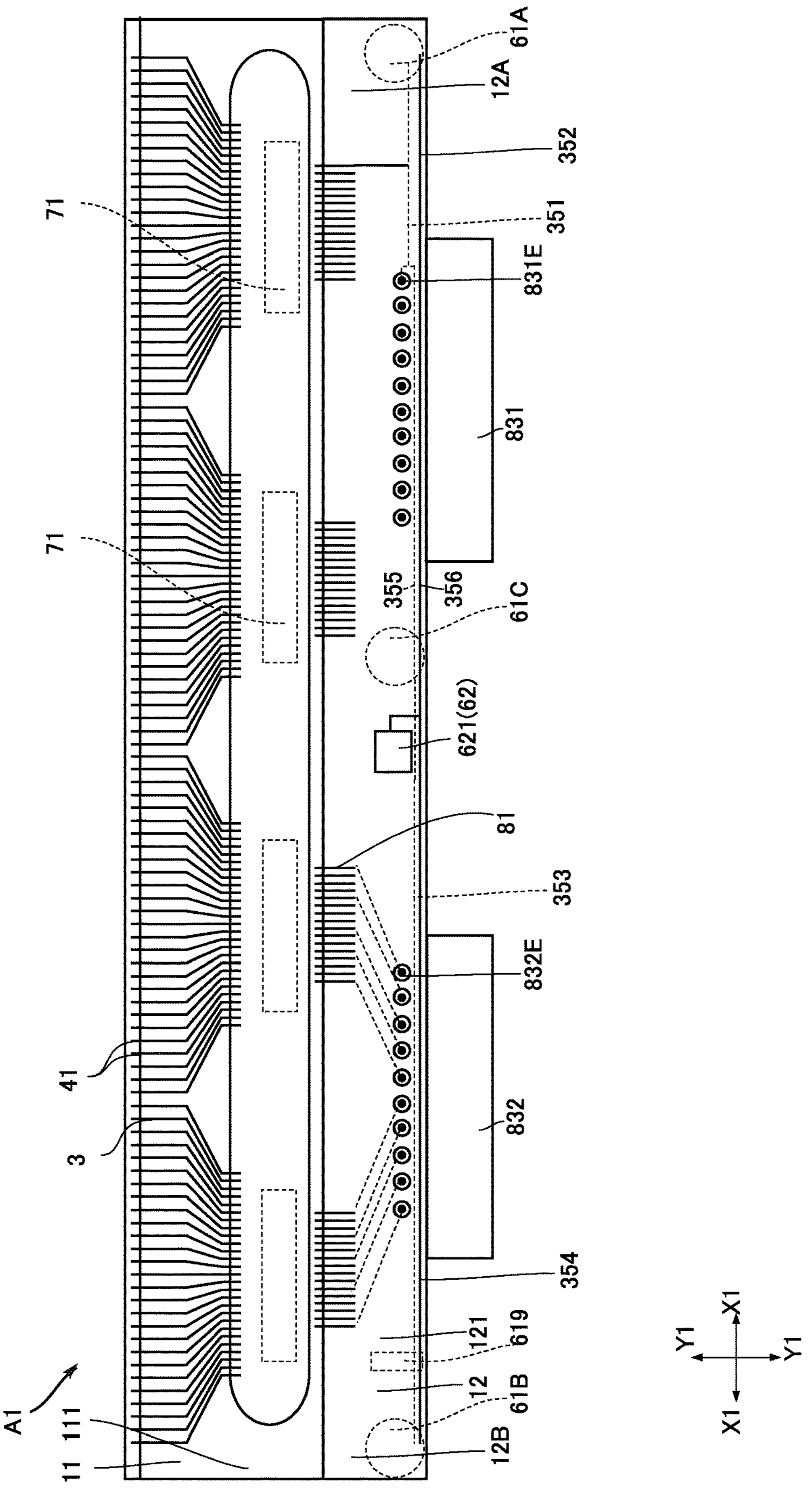
FIG. 9 is a plan view showing still another example of the configuration of the thermal printhead.
Figure 10:
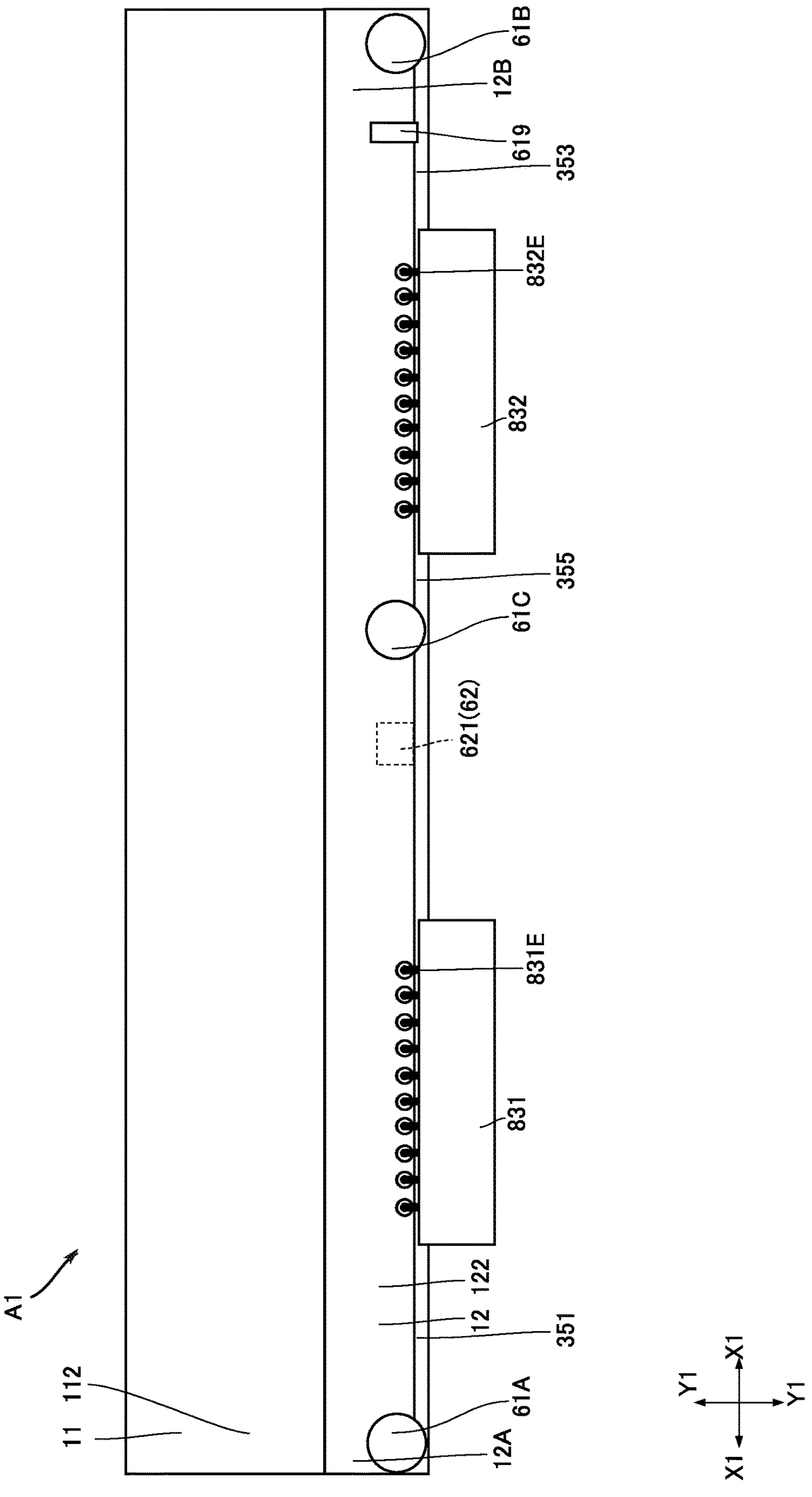
FIG. 10 is a back view showing the example of the configuration of the thermal printhead.
Figure 11:
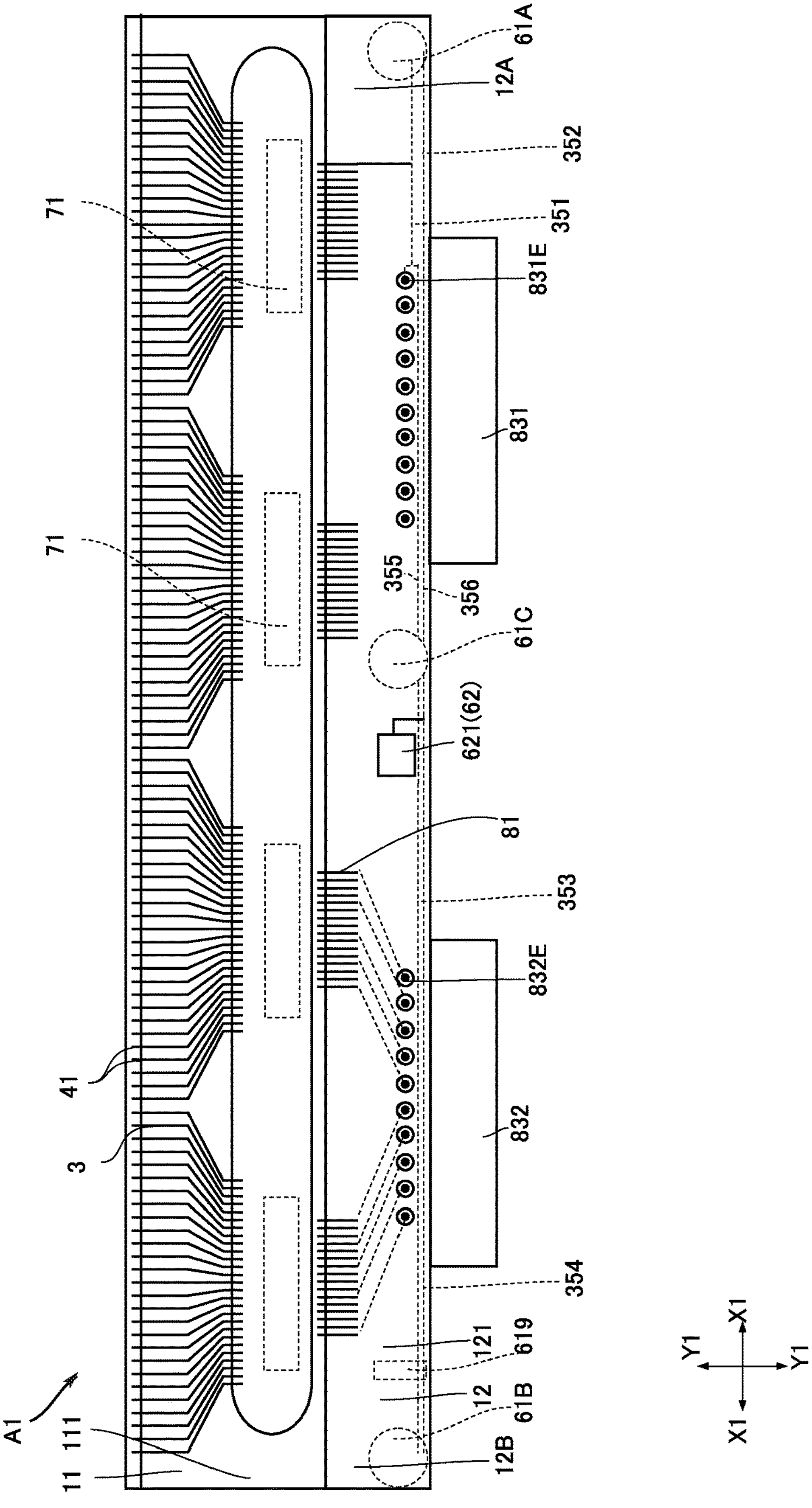
FIG. 11 is a plan view showing yet another example of the configuration of the thermal printhead.
Figure 12:
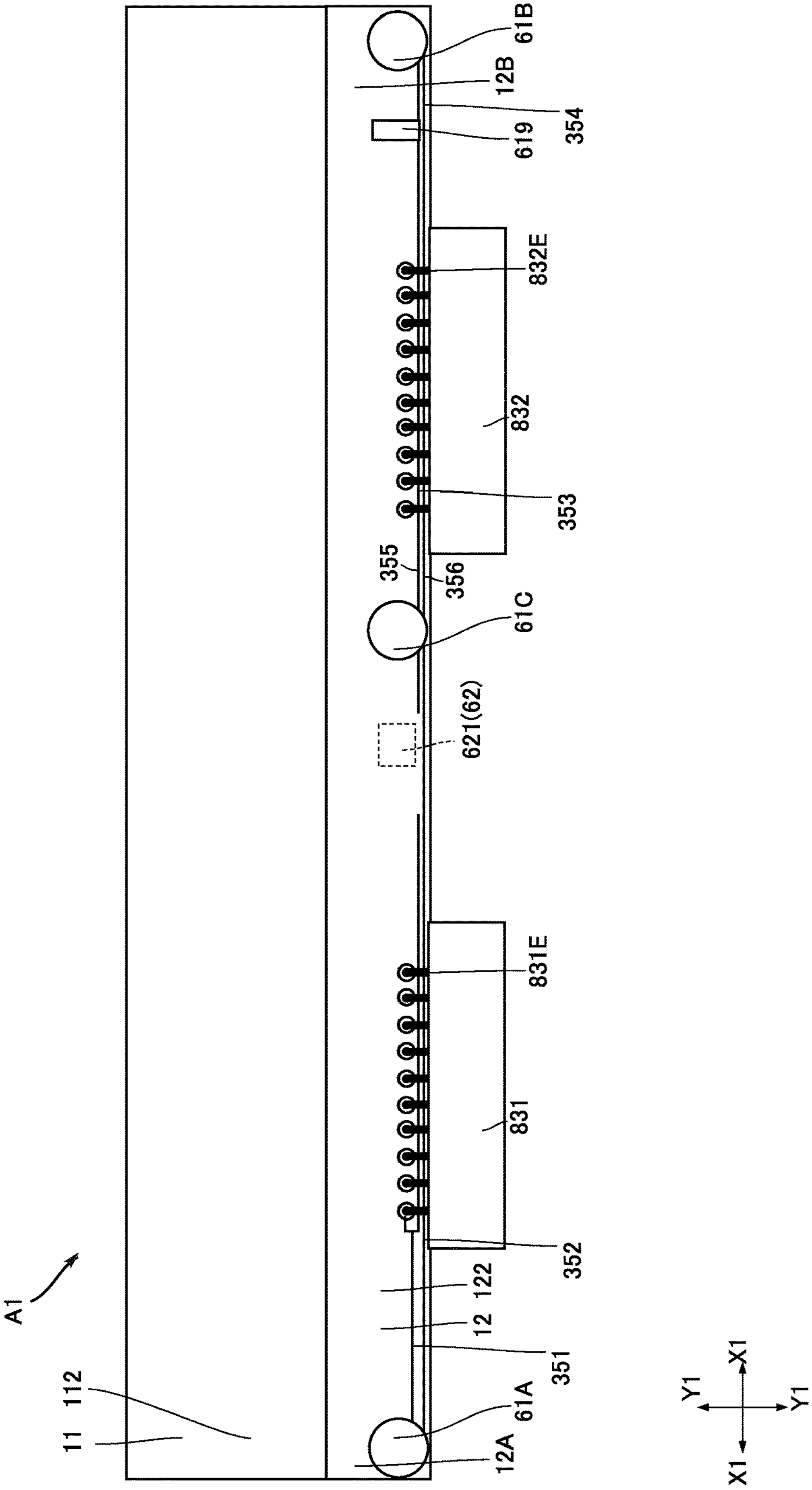
FIG. 12 is a back view showing the example of the configuration of the thermal printhead.

FIGS. 7 to 12 show variations of the physical arrangement of the first wiring element 351, the second wiring element 352, the third wiring element 353, the fourth wiring element 354, the fifth wiring element 355 and the sixth wiring element 356 in the thermal printhead. In FIGS. 7 and 8, the first wiring element 351, the third wiring element 353, and the fifth wiring element 355 are disposed on the obverse surface 121 of the second substrate 12, while the second wiring element 352, the fourth wiring element 354 and the sixth wiring element 356 are disposed on the reverse surface 122 of the second substrate 12. In FIGS. 9 and 10, the first wiring element 351, the third wiring element 353 and the fifth wiring element 355 are disposed on the reverse surface 122 of the second substrate 12, while the second wiring element 352, the fourth wiring element 354 and the sixth wiring element 356 are disposed on the obverse surface 121 of the second substrate 12. In FIGS. 11 and 12, the first wiring element 351, the second wiring element 352, the third wiring element 353, the fourth wiring element 354, the fifth wiring element 355 and the sixth wiring element 356 are disposed on the reverse surface 122 of the second substrate 12.

Figure 13:
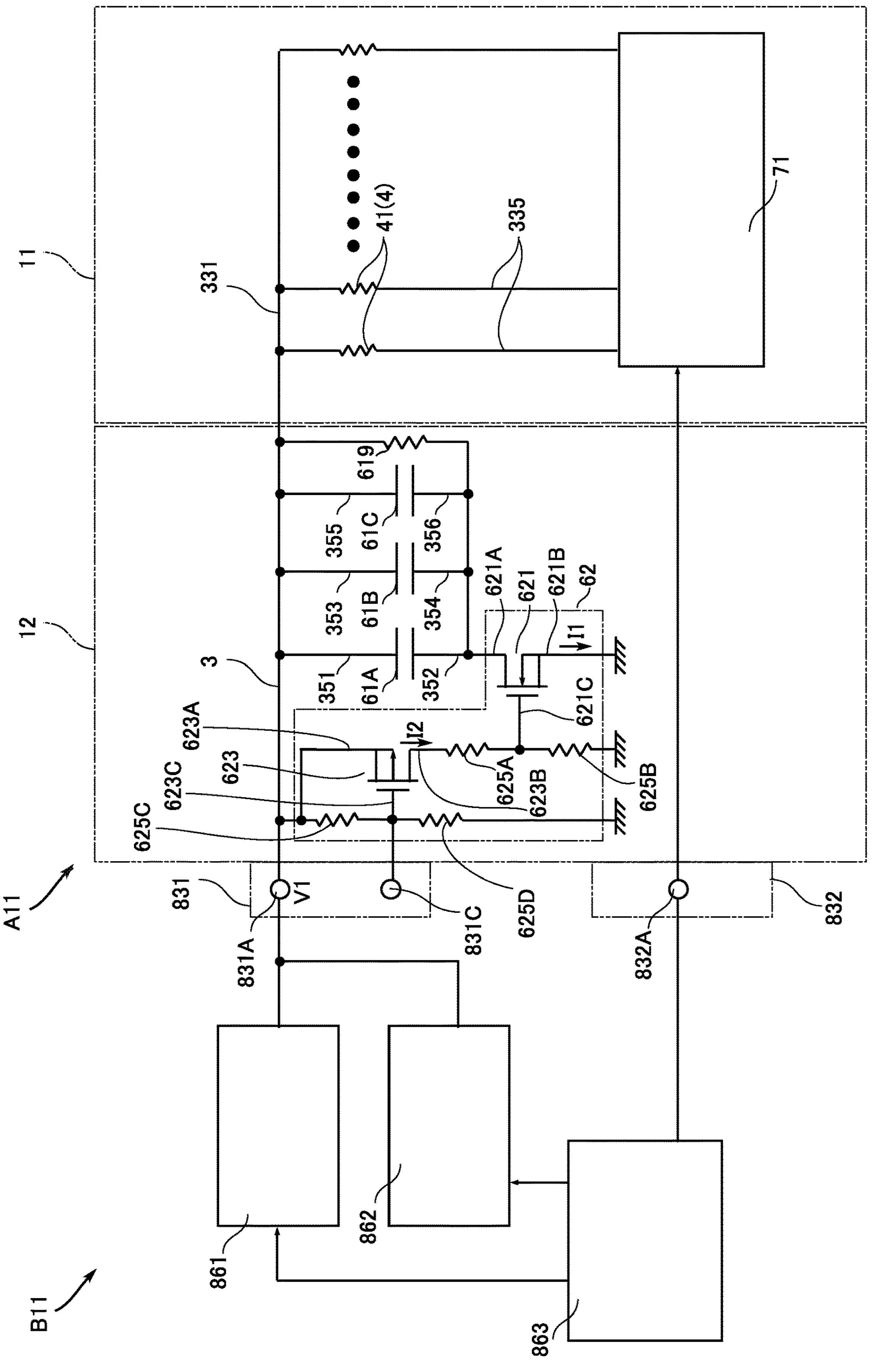
FIG. 13 is a circuit diagram showing a first variation of the thermal printhead of the first embodiment.

First embodiment, first variation:

FIG. 13 shows a thermal printhead A11 which is a first variation of the thermal printhead A1, and a thermal printer B11 provided with the thermal printhead. The switch section 62 of the thermal printhead A11 of the present variation includes a second transistor 623, the second resistor 625A, the third resistor 625B, a fourth resistor 625C, and a fifth resistor 625D.

The second transistor 623 is electrically connected in series to the second resistor 625A. The second transistor 623 is electrically disposed between the first connector terminal 831A and the first control terminal 621C of the first transistor 621.

The second transistor 623 includes a third switch terminal 623A, a fourth switch terminal 623B, and a second control terminal 623C. In the present embodiment, the second transistor 623 is preferably a P-channel MOSFET, but may be an N-channel MOSFET. The third switch terminal 623A may be one of the drain electrode and the source electrode of the MOSFET, while the fourth switch terminal 623B may be the other one of the drain electrode and the source electrode. The second control terminal 623C controls the conduction of the current I2 that may flow between the third switch terminal 623A and the fourth switch terminal 623B. The second control terminal 623C may be the gate electrode of the MOSFET. The second control terminal 623C is electrically disposed between the fourth resistor 625C and the fifth resistor 625D. The resistance value of the fourth resistor 625C and the resistance value of the fifth resistor 625D may be the same or may be different. When the second control terminal 623C is connected to the contact between the fourth resistor 625C and the fifth resistor 625D, the fourth resistor 625C and the fifth resistor 625D function as voltage divider resistors.

For example, assume that the resistance values of the second resistor 625A and the third resistor 625B are the same, and that the resistance values of the fourth resistor 625C and the fifth resistor 625D are the same. In this case, when the first potential v11 applied from the main power circuit 861 to the first connector terminal 831A as the potential V1 is, for example, 24V, the potential applied to the second control terminal 623C is 12V. At this time, the current I2 flows sufficiently, and the potential applied to the first control terminal 621C is 12 V. At this time, the current I1 flows sufficiently.

On the other hand, when the second potential v12 applied from the measuring circuit 862 to the first connector terminal 831A is, for example, 6V, the potential applied to the second control terminal 623C is 3V. At this time, the current value of the current I2 is preferably substantially zero, but may be a negligible value. However, because the second transistor 623 functions as a relatively large resistance, the potential applied to the first control terminal 621C is smaller than 1.5 V, and for example, 0.5 V. As a result, the current value of the current I1 can be made smaller. From the above, the value of the current I1 can be made smaller when the second potential v12 is applied to the first connector terminal 831A from the measuring circuit 862 to measure the resistance value of each heating resistor portion 41. Therefore, it is possible to prevent the first capacitor 61A, the second capacitor 61B and the third capacitor 61C from operating to energize the heating resistor portions 41 during the measurement of resistance values of the heating resistor portions 41. This allows the resistance of each heating resistor portion 41 to be measured more accurately by the measuring circuit 862.

In the present variation, the connector 831 includes a first measuring terminal 831C electrically disposed between the fourth resistor 625C and the fifth resistor 625D, as shown in FIG. 13. With such a configuration, a desired potential can be applied to the first measuring terminal 831C. Thus, the resistance value of each heating resistor portion 41 can be measured by using a power supply that applies a smaller potential. Unlike the illustrated example, either one or both of the fourth resistor 625C and the fifth resistor 625D may not be provided. For example, when control is performed from the outside using the first measuring terminal 831C, the fifth resistor 625D may not be provided. In this case, the fourth resistor 625C is present which is electrically connected between the first connector terminal 831A and the first measuring terminal 831C, and no resistor is disposed between the first measuring terminal 831C and the leftmost ground terminal in the figure.

Second Embodiment

Figure 14:
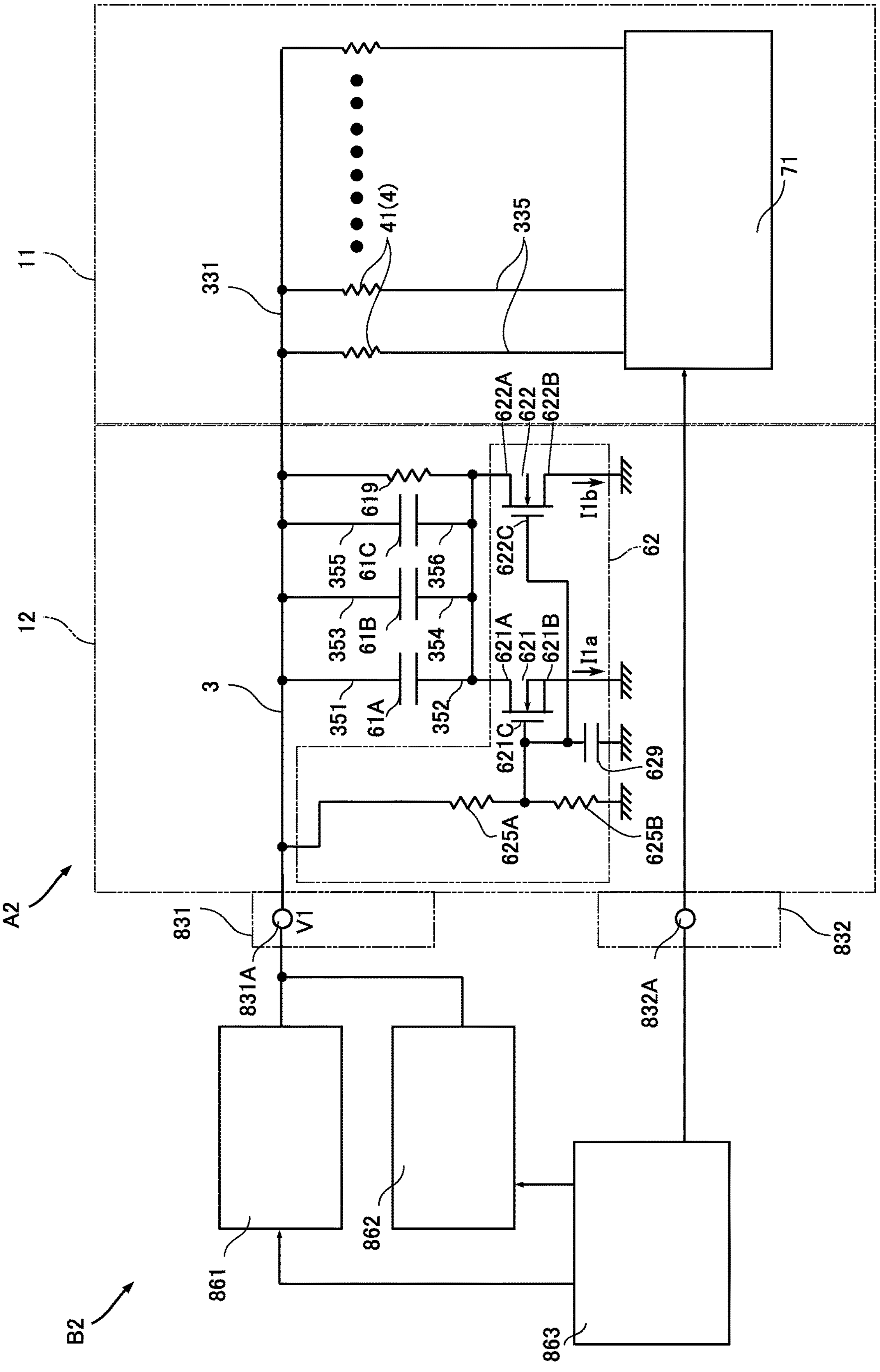
FIG. 14 is a circuit diagram showing a thermal printhead according to the second embodiment.

FIG. 14 shows a thermal printhead A2 according to a second embodiment of the present disclosure, and a thermal printer B2 provided with the thermal printhead. The thermal printhead A2 of the present embodiment differs from the above-described embodiment in configuration of the switch section 62. The switch section 62 of the present embodiment includes a third transistor 622 and a capacitor 629 in addition to the components of the switch section 62 of the above-described thermal printhead A1.

The third transistor 622 is electrically connected in series to the first capacitor 61A, the second capacitor 61B, the third capacitor 61C and the first resistor 619. The third transistor 622 is electrically connected in parallel to the first transistor 621. In the present embodiment, a current I1*a* flows through the first transistor 621, and a current I1*b* flows through the third transistor 622. The sum of the current values of the current I1*a* and the current I1*b* corresponds to the value of the current I1 in the above-described embodiment.

The third transistor 622 includes a fifth switch terminal 622A, a sixth switch terminal 622B, and a third control terminal 622C. In the present embodiment, the third transistor 622 is preferably a P-channel MOSFET, but may be an N-channel MOSFET. The fifth switch terminal 622A may be one of the drain electrode and the source electrode of the MOSFET, while the sixth switch terminal 622B may be the other one of the drain electrode and the source electrode. The third control terminal 622C controls the conduction of the current I1*b* that may flow between the fifth switch terminal 622A and the sixth switch terminal 622B. The third control terminal 622C may be the gate electrode of the MOSFET. The third control terminal 622C is electrically connected to the first control terminal 621C.

The capacitor 629 is electrically connected in series between the first and the second control terminals 621C, 622C and the ground terminal.

According to the present embodiment, when the first capacitor 61A, the second capacitor 61B and the third capacitor 61C are switched on by the switch section 62, the current that flows in the first transistor 621 (the so-called inrush current) can be split into the third transistor 622. Thus, damage to the first transistor 621 by the inrush current can be suppressed.

Moreover, the provision of the capacitor 629 can delay the rise of the inrush current. This is favorable for protecting the first transistor 621 and the third transistor 622.

Second Embodiment, First Variation

Figure 15:
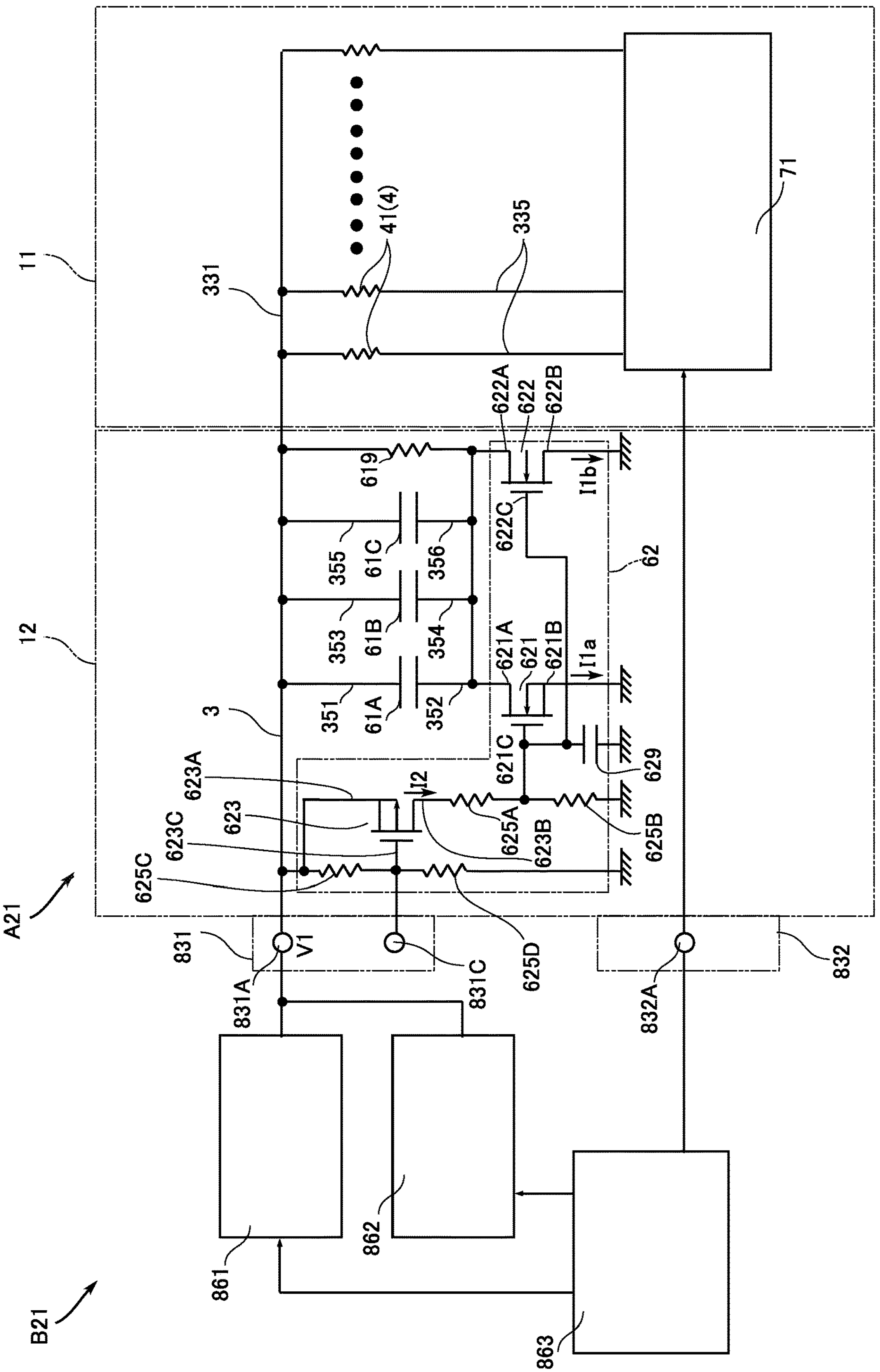
FIG. 15 is a circuit diagram showing a first variation of the thermal printhead according to the second embodiment.

FIG. 15 shows a thermal printhead A21 that is a first variation of the thermal printhead A2, and a thermal printer B21 provided with the thermal printhead. In the thermal printhead A21 of the present variation, the switch section 62 includes the second transistor 623, the fourth resistor 625C and the fifth resistor 625D described in the thermal printhead A11, in addition to the components of the switch section 62 of the thermal printhead A2.

Such a variation provides the effects described in the thermal printhead A11 in addition to the effects described in the thermal printhead A2. As will be understood form this variation, the specific configuration of the switch section 62 can be varied as appropriate.

Third Embodiment

Figure 16:
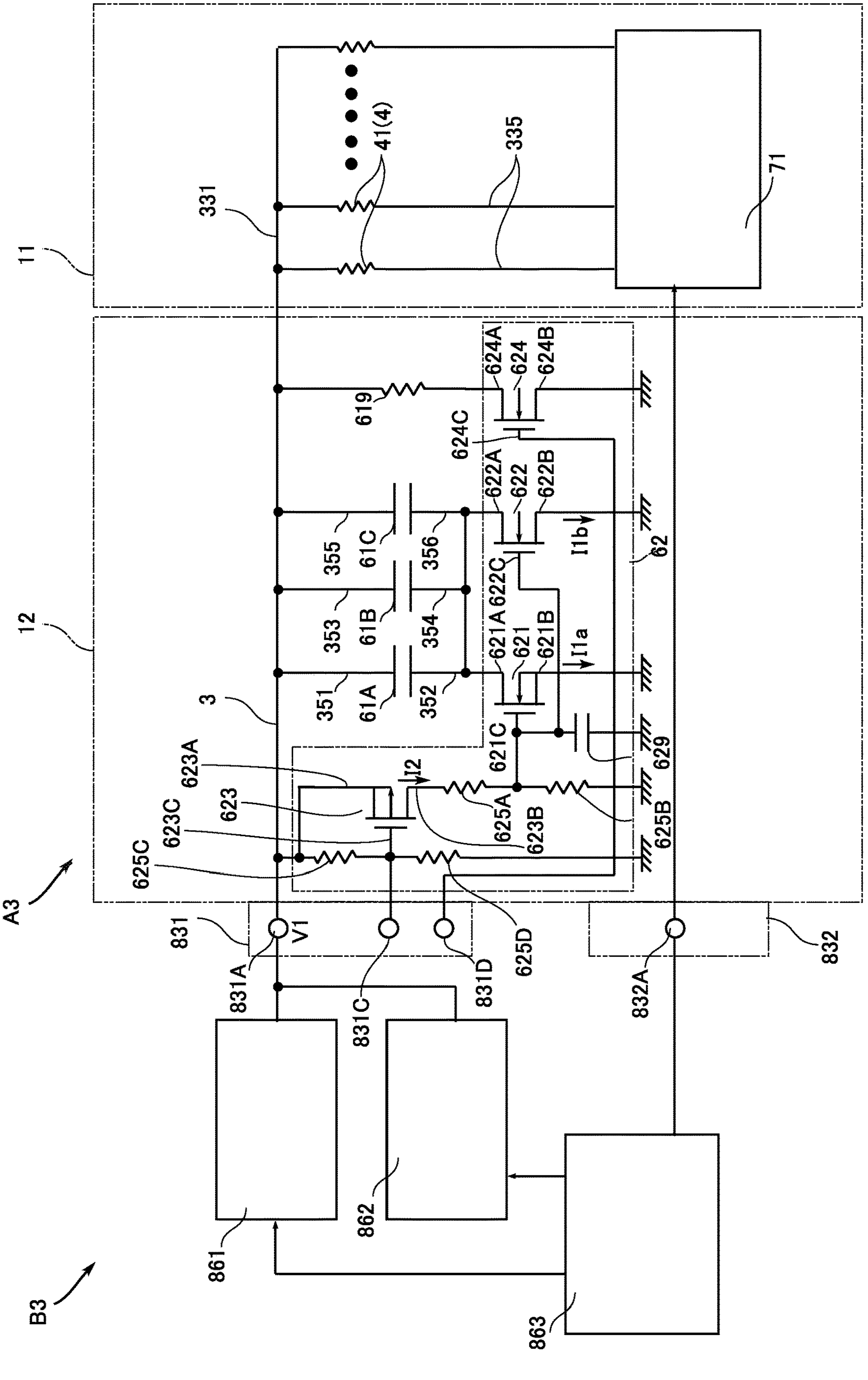
FIG. 16 is a circuit diagram showing a thermal printhead according to a third embodiment.

FIG. 16 shows a thermal printhead A3 according to a third embodiment of the present disclosure, and a thermal printer B3 provided with the thermal printhead. In the thermal printhead A3 of the present embodiment, the first resistor 619 is electrically connected in parallel to the first capacitor 61A, the second capacitor 61B and the third capacitor 61C, but is not electrically connected in series to the first transistor 621 and the third transistor 622.

The switch section 62 of the present embodiment includes a fourth transistor 624. The fourth transistor 624 is electrically connected in series to the first resistor 619. The fourth transistor 624 is not electrically connected in series to the first capacitor 61A, the second capacitor 61B and the third capacitor 61C. The first transistor 621 and the third transistor 622 are electrically connected in parallel to each other. The first transistor 621 and the third transistor 622 are electrically connected in series to the second capacitor 61B and the third capacitor 61C, and are not electrically connected in series to the first resistor 619.

The fourth transistor 624 includes a seventh switch terminal 624A, an eighth switch terminal 624B, and a fourth control terminal 624C. In the present embodiment, the fourth transistor 624 is preferably a P-channel MOSFET, but may be an N-channel MOSFET. The seventh switch terminal 624A may be one of the drain electrode and the source electrode of the MOSFET, while the eighth switch terminal 624B may be the other one of the drain electrode and the source electrode. The fourth control terminal 624C controls the conduction of the current that may flow between the seventh switch terminal 624A and the eighth switch terminal 624B. The fourth control terminal 624C may be the gate electrode of the MOSFET. The fourth control terminal 624C is electrically connected to a second measuring terminal 831D.

The connector 831 of the present embodiment includes the first connector terminal 831A, the first measuring terminal 831C, and the second measuring terminal 831D. The second measuring terminal 831D is a terminal provided separately from the first measuring terminal 831C. A desired potential can be applied to the second measuring terminal 831D separately from the first connector terminal 831A or the first measuring terminal 831C.

The present embodiment also allows more accurate measurement of the resistance values of the heating resistor portions and provides the same effects as the above-described embodiments. The fourth transistor 624 is electrically connected in series to the first resistor 619 and is not electrically connected in series to the first capacitor 61A, the second capacitor 61B and the third capacitor 61C. Therefore, during the printing mode, for example, the first resistor 619 can be electrically disconnected from the heating resistor portions 41 by switching the fourth transistor 624 to OFF while connecting the first capacitor 61A, second capacitor 61B, and third capacitor 61C to the heating resistor portions 41. Thus, unintended power consumption can be suppressed.

The thermal printhead and the thermal printer according to the present disclosure are not limited to the above-described embodiments. Various modifications in design may be made freely in the specific structure of each part of the thermal printhead and the thermal printer according to the present disclosure. The present disclosure includes embodiments described in the following clauses.

Clause 1

A thermal printhead comprising:

a plurality of heating resistor portions electrically connected in parallel to each other;

a first capacitor electrically connected in parallel to the plurality of heating resistor portions;

a switch section electrically connected in series to the first capacitor; and a first resistor electrically connected in parallel to the first capacitor.

Clause 2

The thermal printhead according to clause 1, wherein the first resistor is electrically connected in series to the switch section.

Clause 3

The thermal printhead according to clause 2, further comprising a connector including a first connector terminal, wherein the first connector terminal is electrically connected to each of the plurality of heating resistor portions and the first capacitor, and the switch section is driven based on a potential at the first connector terminal.

Clause 4

The thermal printhead according to clause 3, wherein the switch section includes a first switch terminal and a second switch terminal, when the first connector terminal is at a first potential, a current that flows between the first switch terminal and the second switch terminal has a first current value, when the first connector terminal is at a second potential, a current that flows between the first switch terminal and the second switch terminal has a second current value, and the second potential is smaller than the first potential and greater than 0, and the second current value is smaller than the first current value.

Clause 5

The thermal printhead according to clause 4, wherein the switch section includes a first transistor, and the first transistor includes the first switch terminal, the second switch terminal, and a first control terminal that controls conduction of the current that flows between the first switch terminal and the second switch terminal.

Clause 6

The thermal printhead according to clause 5, wherein the switch section includes a second resistor and a third resistor electrically connected in series to each other, each of the second resistor and the third resistor being electrically connected in parallel to the first capacitor, and the first control terminal is electrically disposed between the second resistor and the third resistor.

Clause 7

The thermal printhead according to clause 6, wherein the switch section includes a second transistor electrically connected in series to the second resistor, and the second transistor is electrically disposed between the first connector terminal and the first control terminal of the first transistor.

Clause 8

The thermal printhead according to clause 7, wherein the second transistor includes a third switch terminal, a fourth switch terminal, and a second control terminal that controls conduction of a current that flows between the third switch terminal and the fourth switch terminal, the switch section includes a fourth resistor and a fifth resistor electrically connected in series to each other, each of the fourth resistor and the fifth resistor being electrically connected in parallel to the first capacitor, and the second control terminal is electrically disposed between the fourth resistor and the fifth resistor.

Clause 9

The thermal printhead according to clause 8, wherein the connector includes a first measuring terminal electrically disposed between the fourth resistor and the fifth resistor.

Clause 10

The thermal printhead according to any one of clauses 4 to 9, further comprising a second capacitor electrically connected in parallel to the plurality of heating resistor portions, the first capacitor and the first resistor, wherein the switch section is electrically connected in series to the second capacitor.

Clause 11

The thermal printhead according to clause 10, further comprising a third capacitor electrically connected in parallel to the plurality of heating resistor portions, the first capacitor, the second capacitor and the first resistor, wherein the switch section is electrically connected in series to the third capacitor.

Clause 12

The thermal printhead according to clause 5, wherein the switch section includes a third transistor electrically connected in series to the first capacitor and the first resistor and connected in parallel to the first transistor.

Clause 13

The thermal printhead according to clause 12, wherein the third transistor includes a third control terminal, and the switch section includes a fourth capacitor electrically connected in series to the first control terminal and the third control terminal.

Clause 14

The thermal printhead according to clause 1, wherein the switch section includes a fourth transistor electrically connected in series to the first resistor, and the first capacitor is electrically connected in parallel to the first resistor and the fourth transistor.

Clause 15

The thermal printhead according to clause 14, wherein the fourth transistor includes a fourth control terminal, and the thermal printhead includes a second measuring terminal electrically connected to the fourth control terminal.

Clause 16

The thermal printhead according to any one of clauses 3 to 13, further comprising:

a first substrate on which the plurality of heating resistor portions are disposed; and a second substrate on which the first capacitor, the switch section and the connector are disposed, wherein the plurality of heating resistor portions are arranged along the primary scanning direction, and the second substrate is disposed at a position offset from the first substrate in a secondary scanning direction orthogonal to the primary scanning direction.

Clause 17

A thermal printer comprising:

the thermal printhead as set forth in any one of clauses 4 to 13;

a main power circuit configured to apply a first potential to the first connector terminal; and a measuring circuit configured to apply a second potential to the first connector terminal.

REFERENCE NUMERALS

A1, A11, A2, A21, A3: Thermal printhead
B, B1, B11, B2, B21, B3: Thermal printer
3: Wiring
4: Resistor layer
11: First substrate
12: Second substrate
12A: First end region
12B: Second end region
13: Heat dissipation plate
41: Heating resistor portion
61A: First capacitor
61B: Second capacitor
61C: Third capacitor
62: Switch section
71: Drive IC
72: Cover
73: Wire
81: Wire
82: Sealing resin
111: Obverse surface
112: Reverse surface
121: Obverse surface
122: Reverse surface
331: Common electrode
335: Individual electrode
351: First wiring element
352: Second wiring element
353: Third wiring element
354: Fourth wiring element
355: Fifth wiring element
356: Sixth wiring element
619: First resistor
621: First transistor
621A: First switch terminal
621B: Second switch terminal
621C: First control terminal
622: Third transistor
622A: Fifth switch terminal
622B: Sixth switch terminal
622C: Third control terminal
623: Second transistor
623A: Third switch terminal
623B: Fourth switch terminal
623C: Second control terminal
624: Fourth transistor
624A: Seventh switch terminal
624B: Eighth switch terminal
624C: Fourth control terminal
625A: Second resistor

625B: Third resistor
625C: Fourth resistor
625D: Fifth resistor
629: Capacitor
721: Covering part
721A: Inclined surface
722: Side part
801: Print medium
802: Platen roller
831: Connector
831A: First connector terminal
831C: First measuring terminal
831D: Second measuring terminal
831E: Connector electrode
831F: Joint
832: Connector
832A: Second connector terminal
832E: Connector electrode
832F: Joint
861: Main power circuit
862: Measuring circuit
863: Control unit
I1, I1$a$, I1$b$, I2: Current
V1: Potential
X1: Primary scanning direction
Y1: Secondary scanning direction
Z1: Thickness direction
v11: First potential
v12: Second potential

The invention claimed is:

1. A thermal printhead comprising:
a plurality of heating resistor portions electrically connected in parallel to each other;
a first capacitor electrically connected in parallel to the plurality of heating resistor portions;
a switch section electrically connected in series to the first capacitor and disposed between the first capacitor and a ground potential; and
a first resistor electrically connected in parallel to the first capacitor with no switch intervening between the first resistor and the first capacitor.

2. The thermal printhead according to claim 1, wherein the first resistor is electrically connected in series to the switch section.

3. The thermal printhead according to claim 2, further comprising a connector including a first connector terminal, wherein
the first connector terminal is electrically connected to each of the plurality of heating resistor portions and the first capacitor, and
the switch section is driven based on a potential at the first connector terminal.

4. The thermal printhead according to claim 3, wherein the switch section includes a first switch terminal and a second switch terminal,
when the first connector terminal is at a first potential, a current that flows between the first switch terminal and the second switch terminal has a first current value,
when the first connector terminal is at a second potential, a current that flows between the first switch terminal and the second switch terminal has a second current value, and
the second potential is smaller than the first potential and greater than 0, and the second current value is smaller than the first current value.

5. The thermal printhead according to claim 4, wherein the switch section includes a first transistor, and
the first transistor includes the first switch terminal, the second switch terminal, and a first control terminal that controls conduction of the current that flows between the first switch terminal and the second switch terminal.

6. The thermal printhead according to claim 5, wherein the switch section includes a second resistor and a third resistor electrically connected in series to each other, each of the second resistor and the third resistor being electrically connected in parallel to the first capacitor, and
the first control terminal is electrically disposed between the second resistor and the third resistor.

7. The thermal printhead according to claim 6, wherein the switch section includes a second transistor electrically connected in series to the second resistor, and
the second transistor is electrically disposed between the first connector terminal and the first control terminal of the first transistor.

8. The thermal printhead according to claim 7, wherein the second transistor includes a third switch terminal, a fourth switch terminal, and a second control terminal that controls conduction of a current that flows between the third switch terminal and the fourth switch terminal,
the switch section includes a fourth resistor and a fifth resistor electrically connected in series to each other, each of the fourth resistor and the fifth resistor being electrically connected in parallel to the first capacitor, and
the second control terminal is electrically disposed between the fourth resistor and the fifth resistor.

9. The thermal printhead according to claim 8, wherein the connector includes a first measuring terminal electrically disposed between the fourth resistor and the fifth resistor.

10. The thermal printhead according to claim 4, further comprising a second capacitor electrically connected in parallel to the plurality of heating resistor portions, the first capacitor and the first resistor,
wherein the switch section is electrically connected in series to the second capacitor.

11. The thermal printhead according to claim 10, further comprising a third capacitor electrically connected in parallel to the plurality of heating resistor portions, the first capacitor, the second capacitor and the first resistor,
wherein the switch section is electrically connected in series to the third capacitor.

12. The thermal printhead according to claim 3, further comprising:
a first substrate on which the plurality of heating resistor portions are disposed; and
a second substrate on which the first capacitor, the switch section and the connector are disposed,
wherein the plurality of heating resistor portions are arranged along the primary scanning direction, and the second substrate is disposed at a position offset from the first substrate in a secondary scanning direction orthogonal to the primary scanning direction.

13. A thermal printer comprising:
the thermal printhead as set forth in claim 4;
a main power circuit configured to apply a first potential to the first connector terminal; and
a measuring circuit configured to apply a second potential to the first connector terminal.

14. A thermal printhead comprising:
a plurality of heating resistor portions electrically connected in parallel to each other;
a first capacitor electrically connected in parallel to the plurality of heating resistor portions;

a switch section electrically connected in series to the first capacitor;

a first resistor electrically connected in parallel to the first capacitor and electrically connected in series to the switch section; and a connector including a first connector terminal, wherein the first connector terminal is electrically connected to each of the plurality of heating resistor portions and the first capacitor, the switch section is driven based on a potential at the first connector terminal, the switch section includes a first switch terminal and a second switch terminal, when the first connector terminal is at a first potential, a current that flows between the first switch terminal and the second switch terminal has a first current value, when the first connector terminal is at a second potential, a current that flows between the first switch terminal and the second switch terminal has a second current value, the second potential is smaller than the first potential and greater than 0, and the second current value is smaller than the first current value, the switch section includes a first transistor, the first transistor includes the first switch terminal, the second switch terminal, and a first control terminal that controls conduction of the current that flows between the first switch terminal and the second switch terminal, and the switch section includes a third transistor electrically connected in series to the first capacitor and the first resistor and connected in parallel to the first transistor.

15. The thermal printhead according to claim 14, wherein the third transistor includes a third control terminal, and the switch section includes a fourth capacitor electrically connected in series to the first control terminal and the third control terminal.

16. A thermal printhead comprising:

a plurality of heating resistor portions electrically connected in parallel to each other;

a first capacitor electrically connected in parallel to the plurality of heating resistor portions;

a switch section electrically connected in series to the first capacitor; and a first resistor electrically connected in parallel to the first capacitor, wherein the switch section includes a fourth transistor electrically connected in series to the first resistor, and the first capacitor is electrically connected in parallel to the first resistor and the fourth transistor.

17. The thermal printhead according to claim 16, wherein the fourth transistor includes a fourth control terminal, and the thermal printhead includes a second measuring terminal electrically connected to the fourth control terminal.

* * * * *